United States Patent
Craner

(10) Patent No.: US 6,882,971 B2
(45) Date of Patent: Apr. 19, 2005

(54) METHOD AND APPARATUS FOR IMPROVING LISTENER DIFFERENTIATION OF TALKERS DURING A CONFERENCE CALL

(75) Inventor: Michael L. Craner, Exton, PA (US)

(73) Assignee: General Instrument Corporation, Horsham, PA (US)

( * ) Notice: Subject to any disclaimer, the term of this patent is extended or adjusted under 35 U.S.C. 154(b) by 35 days.

(21) Appl. No.: 10/197,783

(22) Filed: Jul. 18, 2002

(65) Prior Publication Data

US 2004/0013252 A1 Jan. 22, 2004

(51) Int. Cl.[7] .................................................. G10I 17/00
(52) U.S. Cl. ........................ 704/246; 704/250; 704/276
(58) Field of Search ................................ 704/246, 250, 704/270, 275, 276

(56) References Cited

U.S. PATENT DOCUMENTS

| | | | | |
|---|---|---|---|---|
| 5,127,043 A | * | 6/1992 | Hunt et al. ............... | 379/88.02 |
| 5,404,397 A | * | 4/1995 | Janse et al. ............ | 379/202.01 |
| 5,412,738 A | * | 5/1995 | Brunelli et al. ............. | 382/115 |
| 5,483,588 A | * | 1/1996 | Eaton et al. ........... | 379/202.01 |
| 5,526,325 A | * | 6/1996 | Sullivan et al. ............. | 367/138 |
| 5,930,748 A | * | 7/1999 | Kleider et al. ............... | 704/219 |
| 6,151,571 A | * | 11/2000 | Pertrushin .................... | 704/209 |
| 6,192,342 B1 | * | 2/2001 | Akst ........................... | 704/275 |
| 6,198,693 B1 | * | 3/2001 | Marash ....................... | 367/125 |
| 6,529,871 B1 | * | 3/2003 | Kanevsky et al. .......... | 704/246 |
| 2002/0093531 A1 | * | 7/2002 | Barile ......................... | 345/753 |
| 2003/0044002 A1 | * | 3/2003 | Yeager et al. ............... | 379/444 |

* cited by examiner

Primary Examiner—Vijay B. Chawan
(74) Attorney, Agent, or Firm—Volpe and Koenig, P.C.

(57) ABSTRACT

A method and associated apparatus for indicating the voice of each talker from a plurality of talkers to be heard by a listener. The method uses a signal that is transmitted over a telecommunications system. The method includes projecting the voice from each one of the plurality of talkers to the listener. A talker indicator is provided proximate to the listener. Talker identification information is generated in the talker indicator that can be used to indicate the identity of each talker who is speaking at any given time to the listener. A device is coupled to the talker indicator that can transmit the voice signal from each talker to the listener. In different aspects, the talker identification information can include such varied indicators as audio, video, or an announcement combined with a temporally compressed voice signal. In another aspect, an emotographic figure is displayed to the listener that each represent a distinct talker. The mood of each emotographic is somehow configured to reflect the mode of the talker, as indicated by the talker's voice.

60 Claims, 14 Drawing Sheets

MAD

HAPPY

SAD

METHOD AND APPARATUS FOR IMPROVING LISTENER DIFFERENTIATION OF TALKERS DURING A CONFERENCE CALL

FIELD OF THE INVENTION

This invention relates to communication systems and more particularly to talker identifier systems to be used in communication systems.

BACKGROUND OF THE INVENTION

Telephone systems have become more sophisticated and more complex compared with the plain old telephone systems (POTS). For example, digital telephones and Voice over Internet (VoIP) systems have been developed to provide excellent quality service, and allow such listener interaction as call waiting, call monitoring, and voicemail.

Teleconferencing represents another development in which voices are combined with high-bandwidth video so a listener can see to whom they are talking.

Technical challenges associated with the teleconferencing include affordably transferring large volumes of voice and video information that is required for such systems. Additionally, teleconferencing systems are often subject to frequent updates as more advanced hardware and/or software technology is developed. One solution to handle the expense of teleconferencing systems is to limit the amount of bandwidth allocated for each teleconferencing system. An example of one relatively low-bandwidth teleconferencing system is the so-called video conferencing system that can be integrated on a computer (e.g., a personal computer) that can transfer video to a similar video conferencing system associated with another computer. Such video conferencing systems are commercially available, but are of limited quality.

As the technology associated with advanced telephone, teleconferencing, and video conferencing systems improves and becomes mature and accepted, other challenges are surfacing. When a listener is listening to one or more remote talkers located at one or more remote locations over a teleconferencing system, it is sometimes difficult for the listener to differentiate which talker is speaking at any given time. Each talker also acts as a listener, and vice versa, in full duplex communication systems. The difficulty in differentiating current talkers becomes especially pronounced if the video does not provide a continuous moving image of the talkers, or if the talker is communicating over a strictly audio communication link. It is difficult to identify the current remote talker if two or more talkers are using the same telephone or teleconferencing system particularly when talkers enter or leave a discussion at different times, or if the voices are of a similar nature. Difficulty in identifying the current talker not only diminishes the effectiveness of such systems, but also diminishes the listener's enjoyment of using, and interaction with, such systems.

One difficulty with teleconferencing and other video systems is the privacy considerations. People may not want to answer video phones in their own home, hotel, office, etc., because they do not wish to have the person making the call physically see them. The number of unlisted phone numbers indicates the significance of privacy considerations for certain individuals. This desire for privacy for certain individuals may be limited to certain times.

SUMMARY OF THE INVENTION

A method and associated apparatus for conveying a voice signal from a talker. The talker can be one of a group of talkers, all of who are located proximate to one voice capture device, or to a number of voice capture devices at various remote locations. The voice signals are conveyed over a voice-based network to listeners located at a single voice-projecting device. The method and associated apparatus indicates the voice of each talker from a plurality of talkers to be heard by a listener. The method uses a signal that is transmitted over a telecommunications system. The method includes projecting the voice from each one of the plurality of talkers to the listener. A talker indicator is provided proximate to the listener. Talker identification information is generated in the talker indicator that can be used to indicate the identity of each talker to the listener. The talker indicator can transmit the voice signal from each talker to the listener. In different aspects, the talker identification information can include such varied indicators as audio, video, or an announcement combined with a temporally compressed voice signal. In another aspect, emotographic figures are displayed to the listener that represent each distinct talker. The mood of each emotographic figure is configured to reflect the mode of the talker, as indicated by the talker's voice. In certain aspects of the present disclosure, it would be desirable to provide a talker identifier system wherein each voice from multiple talkers is identified to a remotely located listener. In another aspect, it would be desirable to provide such a talker identifier system that requires limited bandwidth. In another aspect, it would be desirable for a display to provide visual clues about the person who is actually talking at during a period of time. In yet another aspect, it would be desirable to indicate the attitude and/or the veracity of a talker to the listener. In still another aspect, it would be desired to provide a teleconferencing system in which a moving figure representing a person, instead of the image of the person, is transmitted to a remote listener.

BRIEF DESCRIPTION OF THE DRAWINGS

The accompanying drawings, which are incorporated herein and constitute part of this specification, illustrate multiple embodiment of the invention.

DETAILED DESCRIPTION OF THE EMBODIMENTS

I. Talker Identification System Introduction

Figure 1:
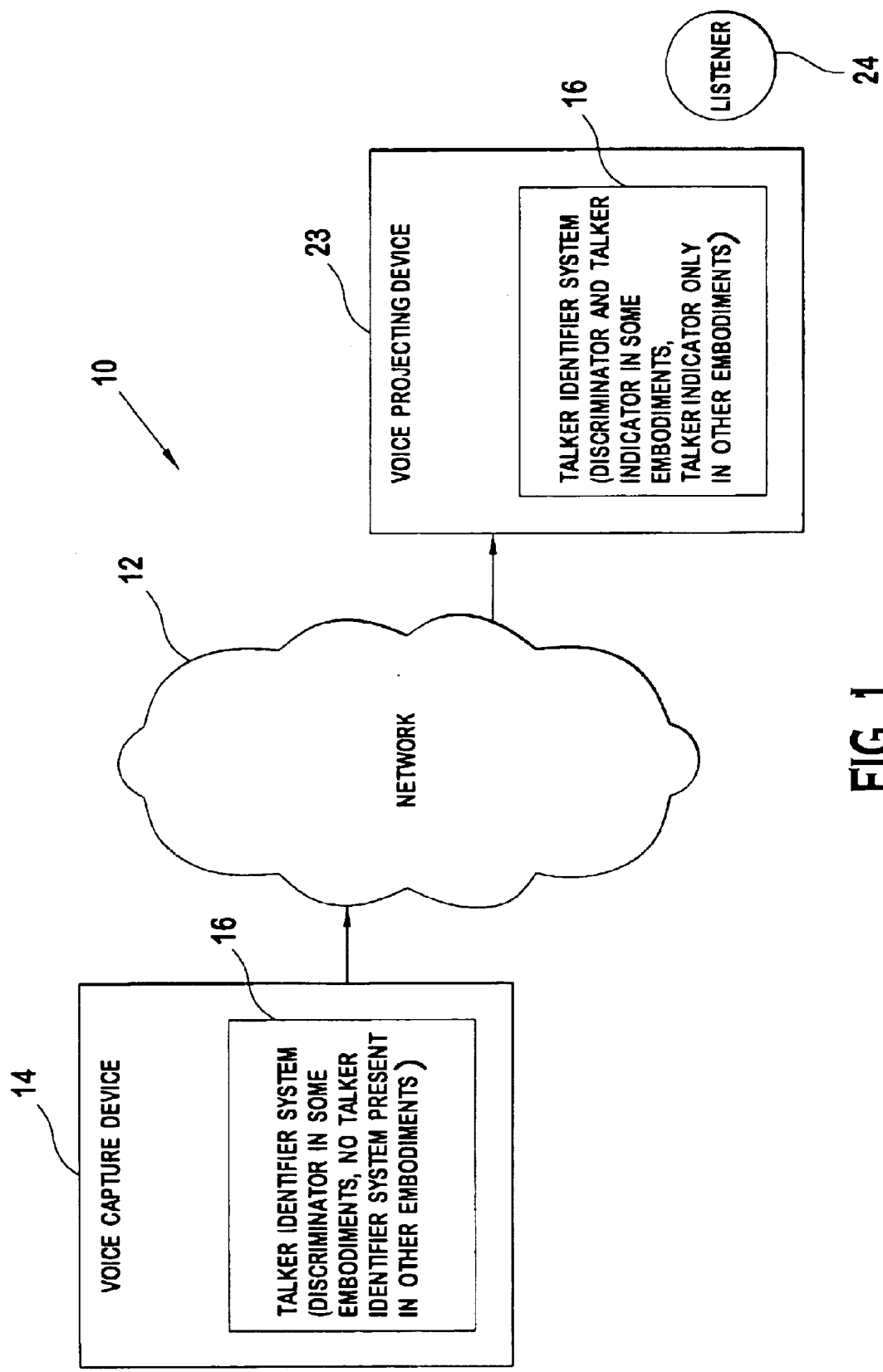
FIG. 1 is a block diagram of a voice communication system including a talker identifier system.

This disclosure describes multiple embodiments of talker identifier systems that in some manner identify to a listener the identity of a remotely located talker, often from a group of multiple potential talkers. One embodiment of voice communication system 10 shown in FIG. 1, for example, enables a listener to be able to distinguish between the voices of multiple talkers using a talker identifier system 16. The voice communication system 10 includes a voice capture device 14, a network 12, a device 23, and a talker identifier system 16. Parts of the talker identifier system in different embodiments of the voice communication system 10 can be included in the voice capture device 14 and/or the voice projecting device 23. The network 12 is configured to be any type of network that can convey voices from a voice capture device 14 to the voice projecting device 23. The term "network" 12 over which the voice communication is established may include a voice over Internet Protocol (VoIP) system, a plain old telephony system (POTS), a digital telephone system, a wired or wireless consumer residence or commercial plant network, a wireless local, national, or international network; or any known type of network used to transmit voice, telephone, data, and/or teleconferencing information. Talker identification information (as described herein) can be conveyed over a side-band of the network and a voice signal (as described herein) can be conveyed over a main band of the network, or vice versa. By comparison, the talker identifier system and the voice signal can be carried over different paths in the same network, or over different networks.

The talker identification system 16 may be incorporated within the voice projecting device, entirely within the voice capture device, or segmented between the voice projecting device and one or more of the (a) voice capture devices, (b) the network, or (c) some other device or external network based device in communication with the primary network. The term "talker" refers to any person or object (e.g., including an artificially or organically intelligent agent or humanoid assisted with a voice synthesis program) that is able to talk (i.e., produce voices or other noises detectable by a typical audio system), that can be identified using a talker indicator. The term "voice" as used in this disclosure intends to apply to the human voice, sound production by machines, music, audio, or any other similar voice or sound. The voice communication system 10 provides for communication from one or more of the voice capture devices 14 over the network 12 to be received by, and output by, a voice projecting device 23. Voices are projected over the voice-projecting device in a manner that can be heard by a listener, whether the voice-projecting device includes a telephone, audio system, personal speaker system, or some other system.

Figure 2:
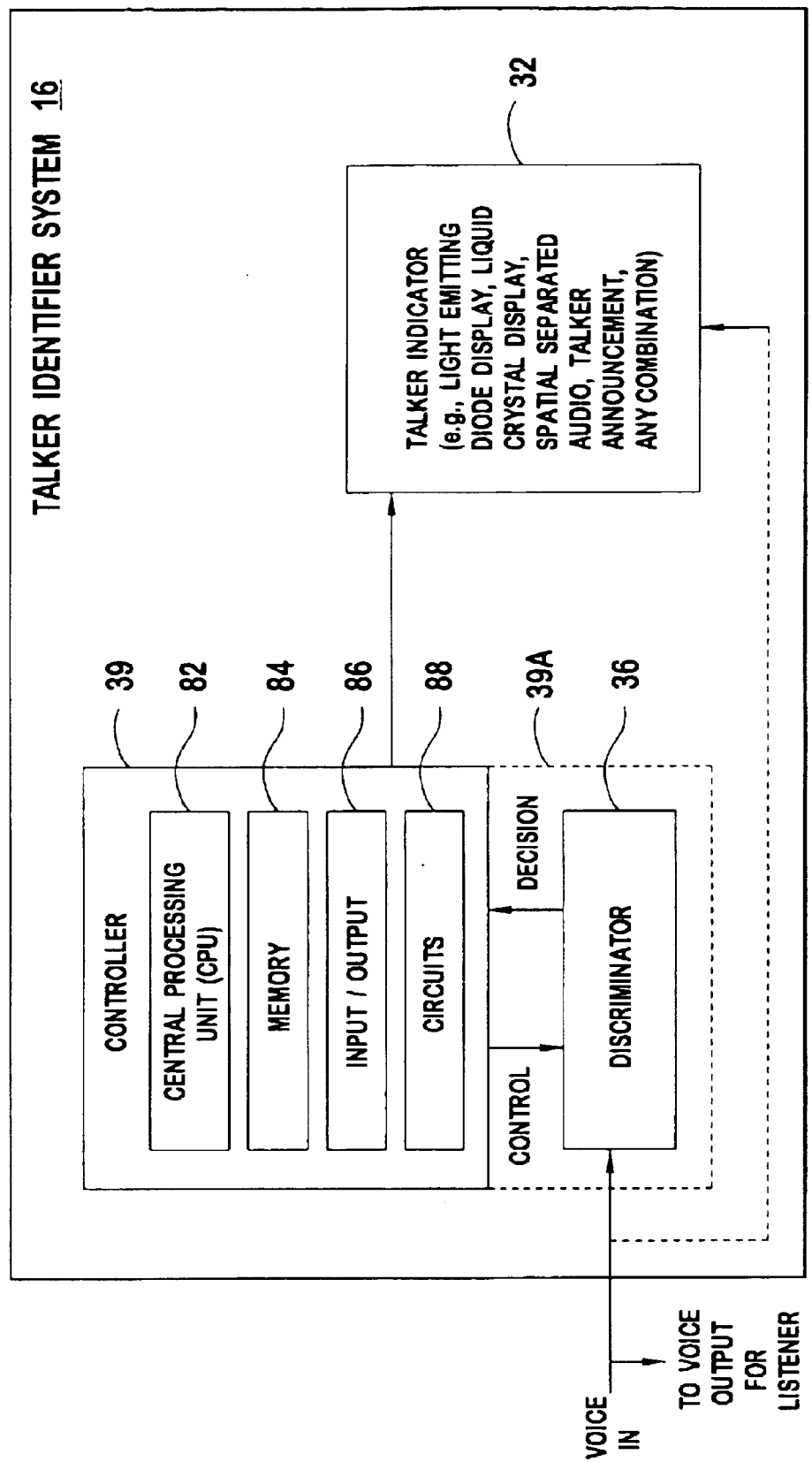
FIG. 2 is a block diagram of the internal components of one embodiment of the talker identifier system shown in FIG. 1 including a talker indicator and a discriminator.

In FIG. 2, the discriminator 36 uses the tonal or timbre characteristics of the voices of the individual talkers and utilizes digital signal processing and spectral correlation techniques to establish which of the known group of talkers is more likely speaking during a given interval of time. Any one of the basic tonal qualities including frequency, attack, decay, cadence on vocal primitives; as well as such higher-level distinctions as accent, gender of the voice, and point of view can be used to help identify the specific talker.

Sound spatializer devices that can be used in the talker indicator embodiment type illustrated by 32 are commercially available from such companies as Dolby Labs and Qsound Labs, Inc.™ and are used to provide three-dimensional sound, also known as surround sound, or virtual surround sound for such applications as home stereo, home theater, movie theaters and computer gaming. Such devices are used in certain embodiments of the present invention to provide a spatial separation between the projected locations of voices from the different talkers.

The voice communication system 10 of FIG. 1 may optionally be configured in a full-duplex configuration where in addition to conference participants being able to simultaneously speak and hear other talkers, the talker indicator of this invention can be present and active on both or a plurality of locations which are conferenced together. The full-duplex configuration may be accomplished by duplicating, and reversing the elements (having similar functions) at each conference location. For example, the voice capture device 14 and the voice projecting device 23 are each duplicated and the location of the duplicate copies are applied respectively to the voice projecting device 23 and the voice capture device 14. Different talkers may talk from separate voice capture devices 14, or alternatively a plurality of talkers may share a single voice capture device 14.

The voice capture device 14 (or a plurality of voice capture devices) is configured to capture voices from one or more talkers, and transmit the voices as voice information over the network to the voice-projecting device 23. The voice capture device and the associated voice projecting device 23 may be as simple as a telephone or stereo phone or, alternatively, may be as complex as a teleconferencing system with video, audio, and data communications. The voice projecting device 23 projects the voice of one or more of the talkers to one or more listeners located proximate to the voice-projecting device. The talker identifier system 16 may be configured in a variety of embodiments, but the overall configuration allows for the identity of a current talker to be transmitted to a listener located proximate the voice-projecting device. The listener located at the voice-projecting device can therefore use output from the voice-projecting device to determine the identity of the current talker. The listener can make this determination by being presented with other talker characteristics such as talkers geographical location, identifier, name, biographical data, emotional state, group membership, opinion on various topics, estimated absolute coordinates, estimated relative coordinates with respect to other conference participants. The listener (or talker) can also vote and provide other such information on various topics. This conference participant specific voting information can become part of the talker characteristics database that is presented to a listener when a particular participant is talking.

FIG. 2 shows the block diagram of one embodiment of talker identifier system 16 included in the voice communication system as shown in FIG. 1. Portions of the talker identifier system 16 may be located in the voice capture device 14 and/or the voice projecting device 23. The talker identifier system 16 comprises a controller 39, a discriminator 36, and a talker indicator 32. A voice input signal as generated by the voice capture device 14 is input to the discriminator 36. The discriminator 36 correlates the voice input signal of the talker with stored voice information relating to the voices of each one of the participants in its database of potential talkers.

The controller 39 controls the operation of the talker indicator 32 and the discriminator 36. The controller 39 may be configured as a personal computer, a microprocessor, a server, or some other type of computer or processor. The controller 39 includes a programmable central processing unit (CPU) 82 that is operable with a memory (e.g., RAM, ROM, hard disk and/or removable storage) and well-known support circuits such as power supplies, clocks, cache, input/output (I/O) 86 and the like. By executing software stored in the memory 84, the controller 39 is able to virtually separate and enhance the voice input signal. The controller transmits information relating to the identity of the active talker to the talker indicator 32.

The discriminator 36 may be located at the voice capture device 14, the voice projecting device 23, or be part of the network 12, or any device or network that is in communication with the network 12. The discriminator 36 receives voice information from the voice capture device and determines the identity of the talker from a group of possible talkers. One embodiment of the discriminator 36 may be of the type described generally in U.S. Pat. No. 5,930,748, issued Jul. 27, 1999 to Kleider et al. and entitled "SPEAKER IDENTIFIER SYSTEM AND METHOD" (incorporated herein by reference in its entirety).

An alternate implementation of the voice recognition portion of the discriminator is based on the Complex Cepstrum. The operation of one embodiment of complex cepstrum related to speech recognition is disclosed in the book "Musical Applications of Microprocessors", by Hal Chamberlin, Hayden Book Company, Inc., New Jersey, 1980, pp 526–534 (incorporated herein by reference in its entirety).

One embodiment of complex cepstrum is now described. S(f) is a symmetric spectrum that preserves spectral information for frequencies ranging up to half the sampling rate. A set of cepstrum coefficients, c(n), based on S(f) are obtained. One method for deriving cepstrum coefficients is shown in Equation 1 that displays discrete cosine transform ("DCT") of S(f), in which:

$$c(f) = \frac{1}{N}\sum_{k=0}^{n-1} S\left(\frac{2\pi k}{N}\right) \cdot \cos(\pi k i) \quad (1)$$

where n=1 to Q, wherein c=1 to Q, c(i) is the $i^{th}$ cepstrum coefficient, Q is the number of cepstrum coefficients, and N is the number of points used in FFT computation. Other frequency domain transforms may also be used to derive the cepstrum coefficients. The set of Q cepstrum coefficients are collected into a vector of coefficients. Typically, for a sampling frequency, Q is chosen such that the vector of cepstrum coefficients has a prescribed dimensionality. In addition, features other than cepstrum coefficients, such as linear prediction coefficients and line spectral pairs, have also been used.

After preparing the vector of cepstrum coefficients, the vector is processed as training data or testing data. Typically, this process involves storing a sequence of the vectors until cepstrum coefficients are prepared for each frame of input as a number of short-duration frames of input are typically required for effective training or testing. After collecting the entire set of vectors, a vector quantization ("VQ") algorithm is run on the entire set of stored vectors.

To prepare a codebook, the VQ algorithm extracts a set of M vectors (of cepstrum coefficients) from the entire set of such vectors prepared during training. The set of M vectors are extracted from the entire set of vectors using mathematical principles of grouping and centroids, and computer algorithms based on neural-network principles are often employed in this process. The resulting set of M vectors, each having Q elements, collected into an M time Q matrix unique to the speaker of the training speech signal. It is this matrix of elements which is called a "codebook" and which is used for comparing training speech and testing speech in most systems for computer-assisted speaker identification. Other pattern-detection methods, such as hidden-Markov models, can be adapted to such methods. This use of computer-assisted speaker identification using, e.g., hidden-Markov models, is applicable to (and may be integrated in) the other embodiments of talker identifier system.

The controller 39 interfaces with a discriminator 36, (i.e., the controller transmits information to the discriminator 36), and the controller 39 receives decisions from the discriminator 36. The controller 39 is shown in FIG. 2 as a separate component from the discriminator 36 but, the controller 39 may incorporate a discriminator 36 as indicated by an integrated controller/discriminator 39A. In one embodiment, for example, the controller 39 may be configured to run a computer program that provides the operation of the discriminator 36. In an alternate embodiment, the discriminator 36 operates separately from the controller 39, but under the control of the controller. For example, the discriminator may be an application specific integrated circuit (ASIC). In these embodiments, the controller sends control signals to the ASIC discriminator 36 and receives the decision information from the discriminator.

The talker indicator 32 may be provided in a variety of different embodiments, as described more completely through this disclosure, to indicate the identity of the talker to the listener. For example, the talker indicator 32 may be a light emitting diode (LED) display. Alternatively, the talker indicator 32 may be a liquid crystal display (LCD). In another embodiment, the talker indicator may be an audio device providing spatial separation of the talker's voices. In yet another embodiment, the talker indicator 32 is a talker announcement device. It is emphasized that the talker indicator 32 may also include combinations of multiple embodiments of distinct talker indicators. For example, the talker indicator 32 may be provided with a light emitted diode display in combination with a spatial separated audio device to project the voices of different talkers from distinct spatial locations to the listener. In those embodiments where the talker indicator 32 is configured to be located at the voice projecting device 23, as shown in FIG. 1, the identity of the talker can be indicated to a listener who is located proximate that voice projecting device. Any talker indicator 32 may be used by itself or in combination with other talker indicators to identify talkers. The combined talker indicators can share those components used to identify the talker, but can then indicate the identity of the talker to a listener using different techniques and/or communication mediums.

The voice-projecting device 23 receives talker identification information from the voice capture device, and projects the voice of the talker and the talker identification information to the listener. The talker identification information may include, and may not be limited to, the transmission voice transmission of the talker itself.

Certain embodiments of talker indicators that include spatialization equipment can project the voice of each talker from different and distinct spatial location to the listener. Certain embodiments of talker indicators 32 that include spatialization equipment act to capture spatial coordinates of sound sources, (e.g. a plurality of talkers) relative to a reference at a first location (or multiple locations). The coordinated information is encoded over the standard (typically mono) audio, and relayed by analog or digital means to a remote location where the coordinate information is decoded. The voices or other audio sounds are then reproduced using spatialization equipment utilized at the second location to approximate the sound source separation of the first location.

In many embodiments, it is desired that the talker indicator 32 function independently of whether there is sound source spatializer equipment at either the voice capture device or the voice-projecting device. In other words, if both the voice capture device and the voice projecting device include sound spatialization equipment, the talker indicator 32 can be optimized to precisely reflect the spatial location of the original voices at the voice capture device 14. However, if sound spatialization equipment is only located at the voice projecting device 23 and not the voice capture device 14, the system should still spatially separate the voices at the voice-projecting device since the listener can locate the voices of the talkers using some other techniques as described herein. Providing the sound spatialization equipment at the voice capture device 14 (but not at the voice projecting device 23) results in encoding of spatial information, and should not limit the resulting audio from being used by a listener who does not have equipment to decode this spatial relationship. The voices of the distinct talkers may be spatially separated by distinguishing tonal or timbre characteristics of the voice of each talker (or other such speaker identification technology). The different talker voices can then be artificially spatialized for enhanced separation and sound field representation at the voice capture device 14. The spatial separation of the talker voices on the receiving side can enhance the distinction between the speakers, and with other visual and auditory queues, can assist the listener in distinguishing between various talkers.

Figure 5:
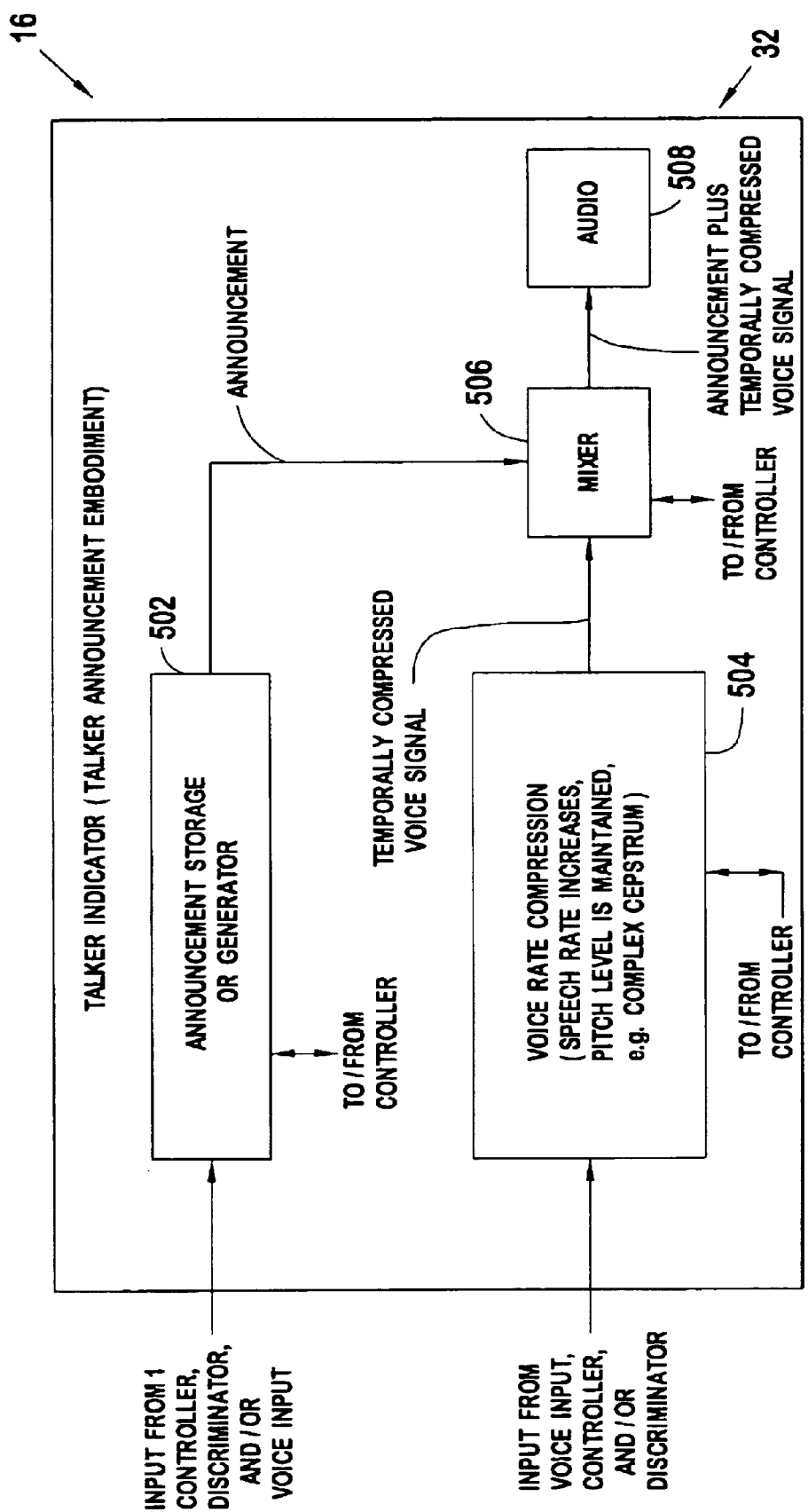
FIG. 5 shows another alternate embodiment of the talker indicator shown in FIG. 2.
Figure 6A:
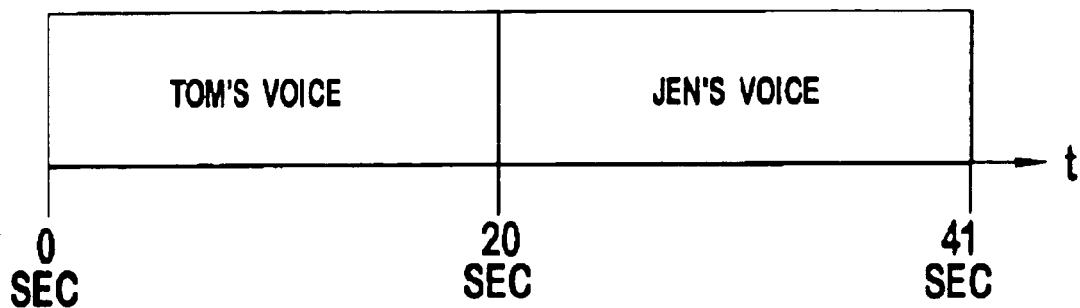
FIG. 6A is a timing diagram of one embodiment of a voice signal input to the voice capture device of the talker identifier system of FIG. 2.
Figure 6B:
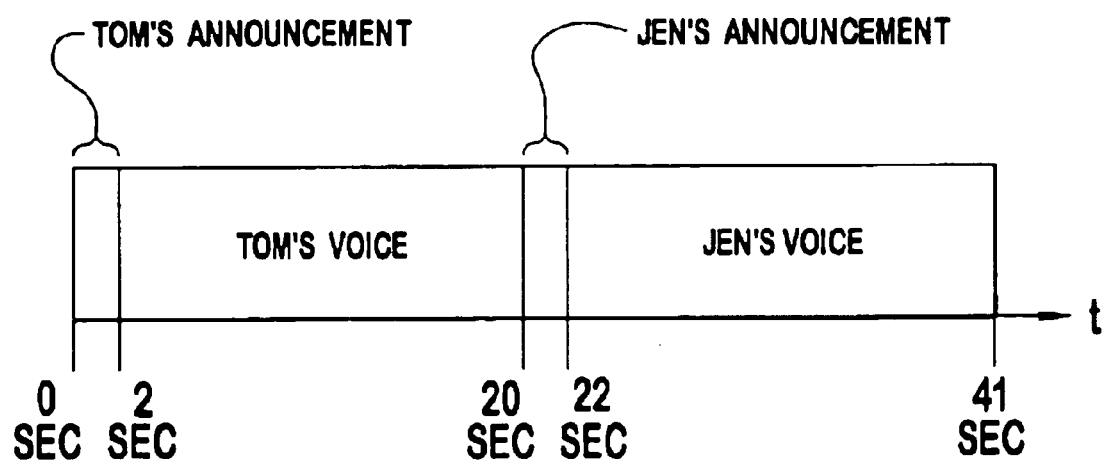
FIG. 6B is a timing diagram of one embodiment of a voice output signal from the voice projecting device of the talker indicator of FIG. 5 given a voice input signal as shown in FIG. 6A.

In the presence of visual clues (or cues), distinct spatial voice locating information that differentiates the spatial location of each talker's voice as it is projected within a three-dimensional setting such as a conference room helps a listener identify the talker. In the absence of visual clues, voice locating information being provided to the listener becomes even more important to help identify talkers. In a voice conference, with multiple talkers and listeners located at one or more remote locations from one another, it is often difficult for the listeners to distinguish between the talkers and keep their identities straight. This identification of talkers is especially difficult if the meeting includes people having similarly sounding voices such as may be the case with people of the same sex, age, geographic, ethnic, or dialectic backgrounds. Additional, speaker identification becomes especially challenging if there are new participants being introduced or current participants exiting the meeting. Certain embodiments of talker indicators 32, as shown relative to FIGS. 5, 6A, and 6B, provide some type of announcement or indication of the identity of the speaker that can be heard or detected by the listener. These announcements or indications may vary from an announcement of the name of each talker inserted prior to the actual sound bite corresponding to that talker. Additionally, each talker can be associated with a musical sequence, a tone, a beep, an alert, a warble, a click, a buzz, or a subsonic pulse. Alternatively, a nasaling program that slightly modifies the audio may be applied to the sound bites of certain talkers to distinguish the different talkers.

Figure 3:
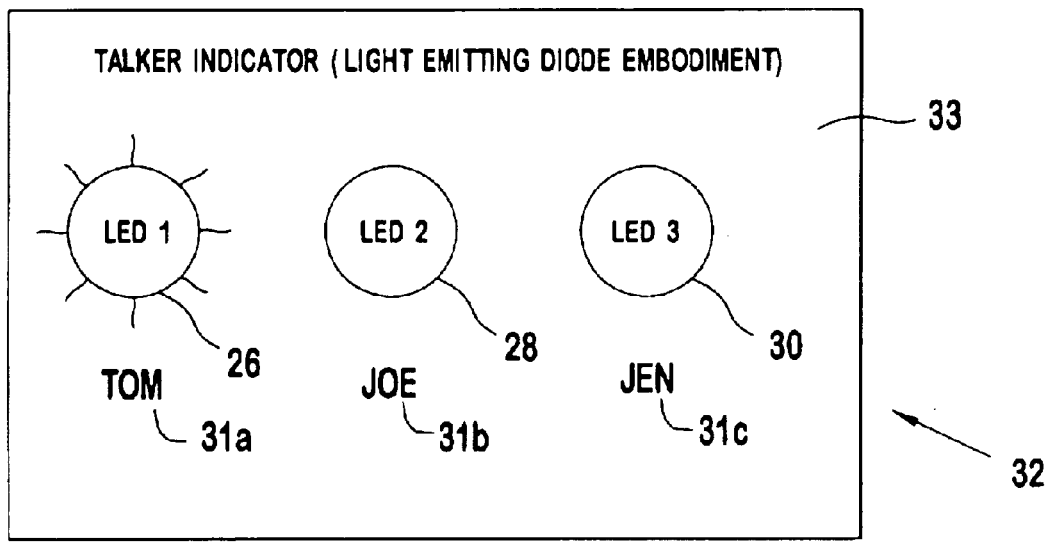
FIG. 3 shows one embodiment of the talker indicator shown in FIG. 2.
Figure 4:
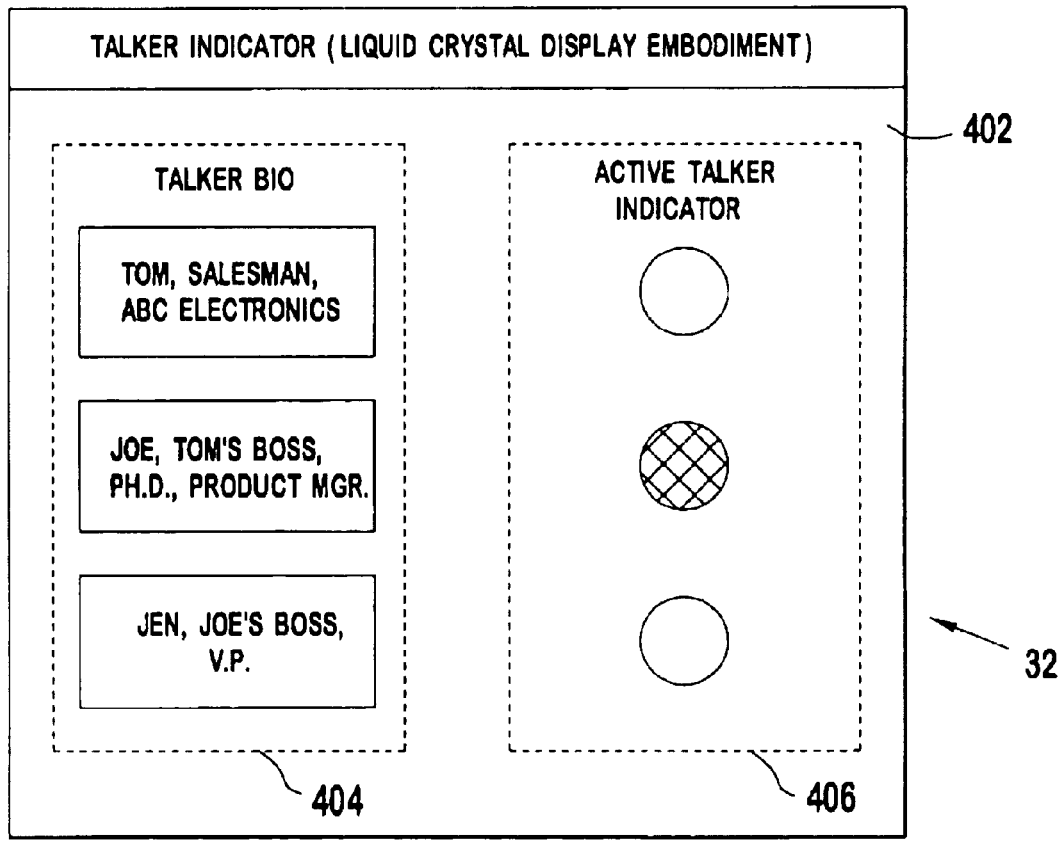
FIG. 4 shows an alternate embodiment of the talker indicator shown in FIG. 2.

In one group of embodiments of the talker indicator 32 as shown in FIGS. 3 and 4, information that includes the identity of a talker is determined and displayed at the voice projecting device. In another group of embodiments of the talker indicator 32, information that includes the identity of a talker is determined at the location of the talker, and this information is then transmitted along with the voice to the listener. The listener who receives the talker identification information can listen to the voice and simultaneously observe the identification information of the talker. In another group of embodiments, the identification of the talker is determined by intelligent agents in the network or distributed between location of the talker, the network and the location of the voice-projecting device.

In certain embodiments of talker indicators, an external database of prestored voiceprints is accessed for a match of the talkers' voices. These embodiments could use a corporate database or a personal database built over time that learns the voiceprints from various prior communications that have occurred with/via this device. With these databases, talker groups are formed based on prior common associations so that if one talker is identified, such as through an exhaustive and potentially time intensive search of a large corporate database, this "group" or common talker groups may be loaded locally for quicker ID of other talkers on the call using a cache hit/miss algorithm.

Figure 10:
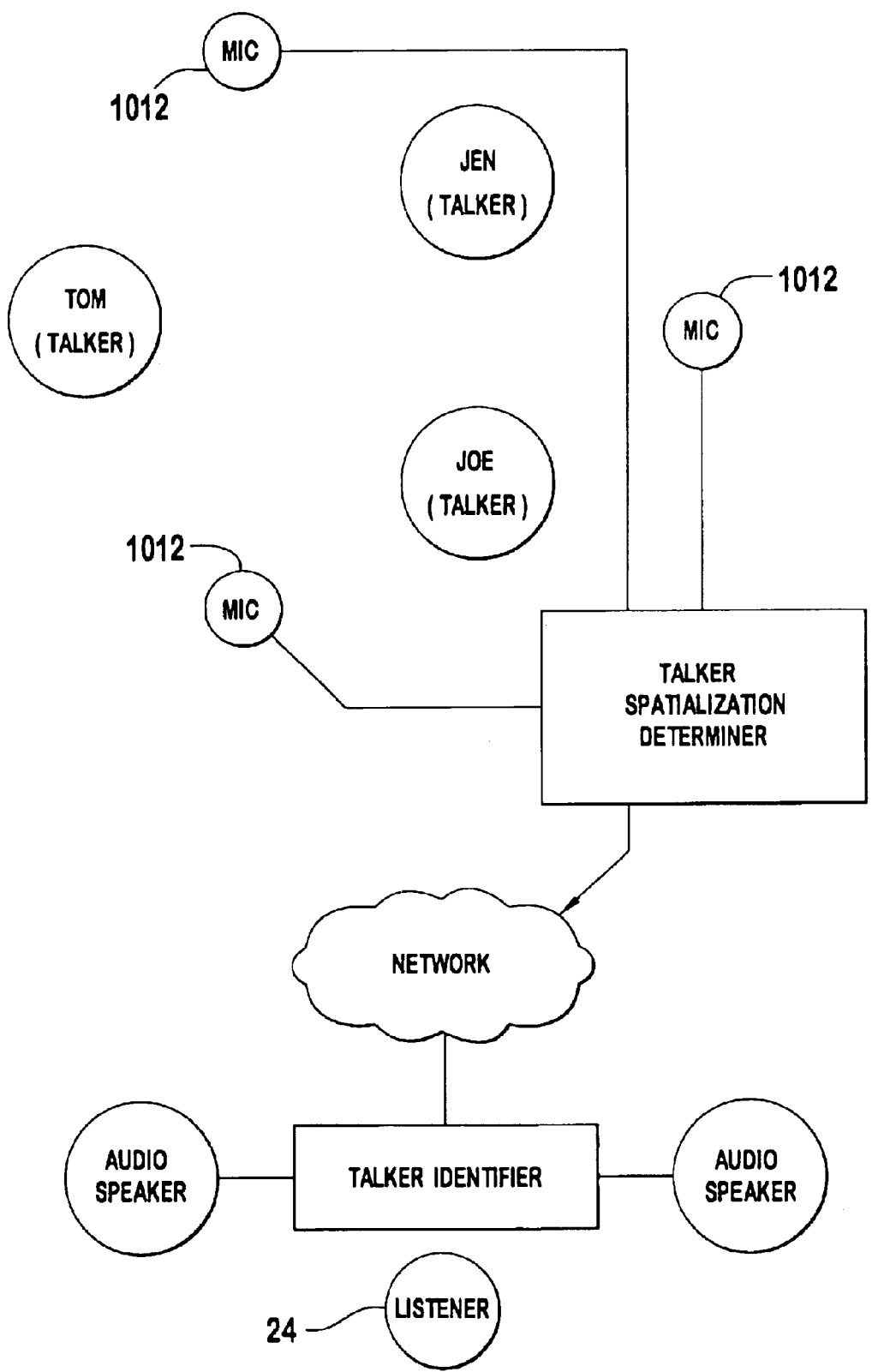
FIG. 10 is a block diagram of one embodiment of a talker identifier system that projects spatially separated voices from the different talkers to the listener.
Figure 11:
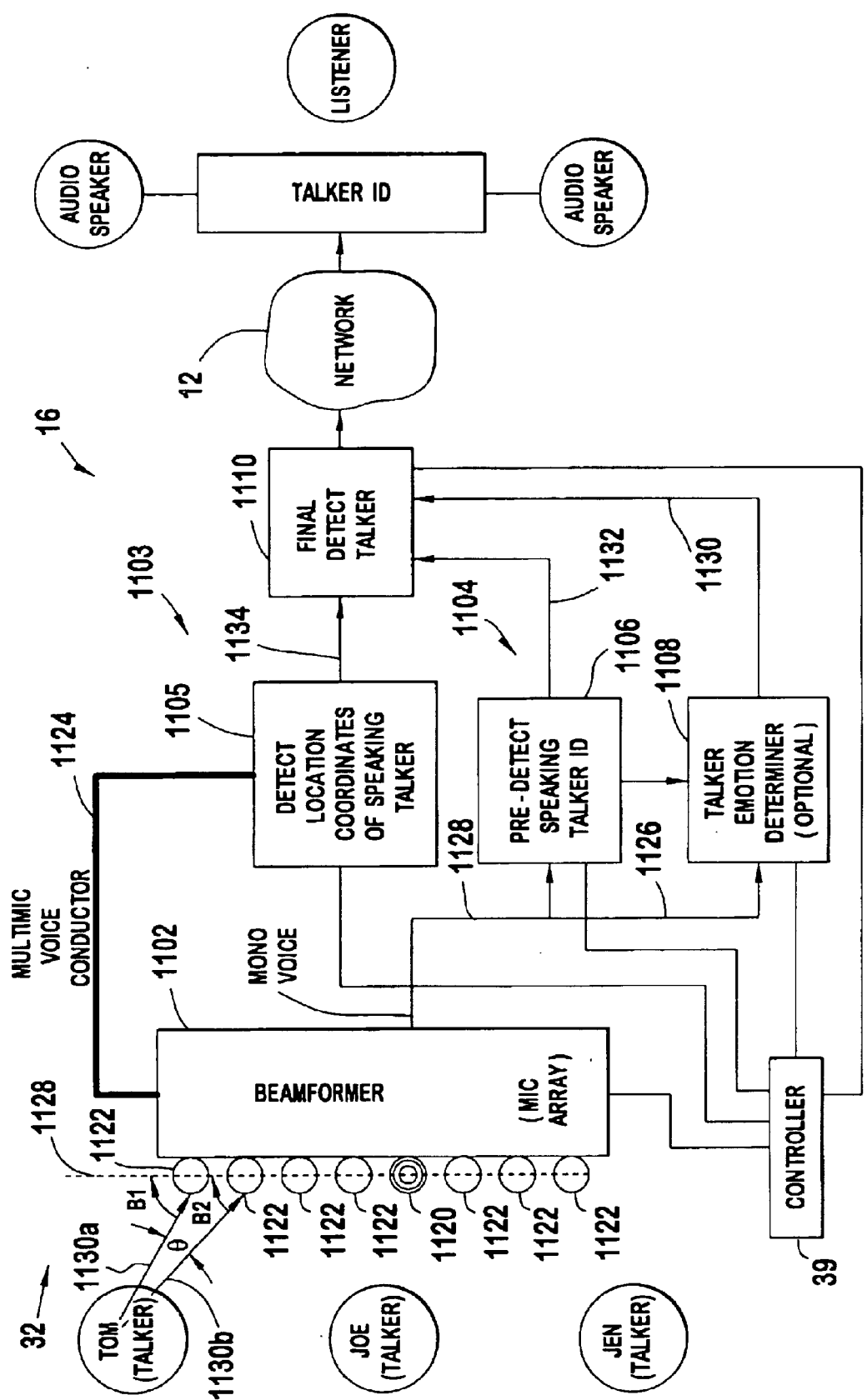
FIG. 11 is a block diagram of another embodiment of a talker identifier system that projects spatially separated voices from the different talkers to the listener.
Figure 12:
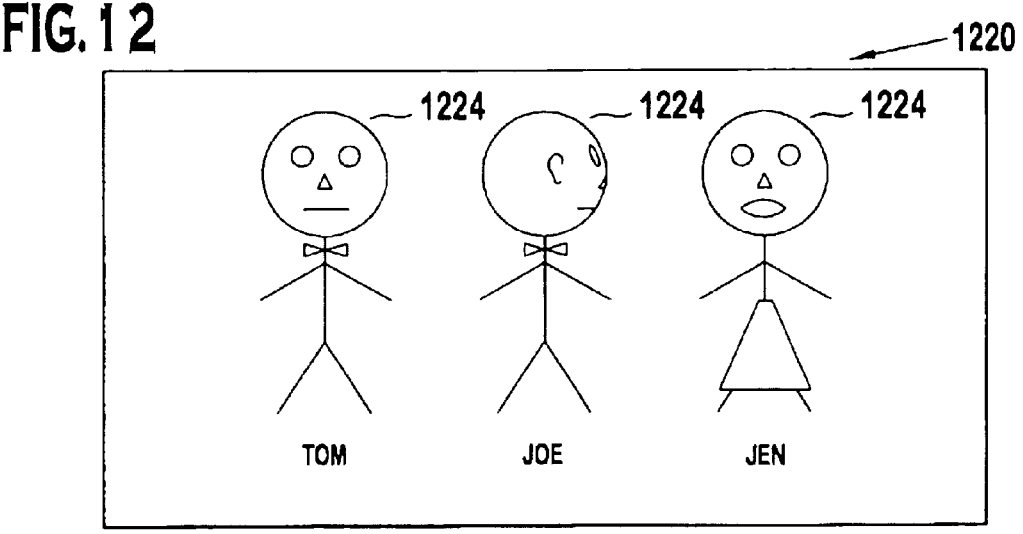
FIG. 12 shows one embodiment of a display showing a plurality of emotigraphics.
Figure 13:
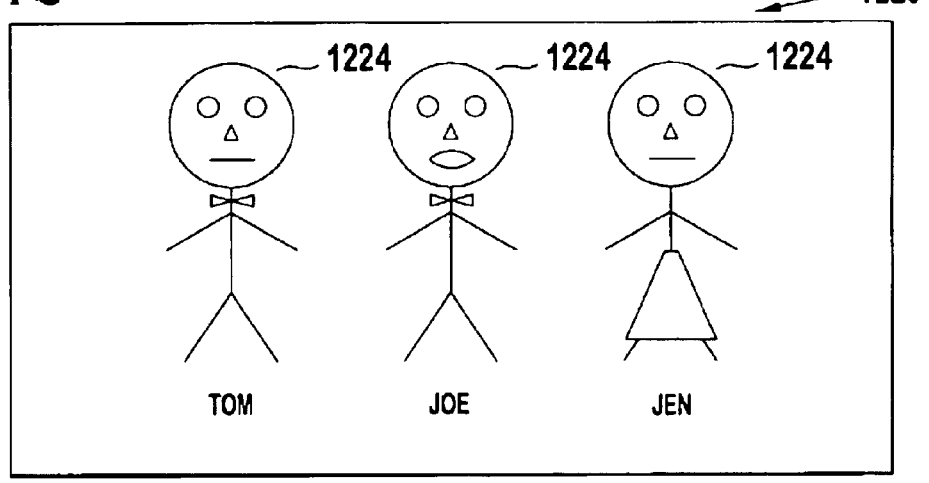
FIG. 13 shows a modified display similar to FIG. 12.
Figure 14:
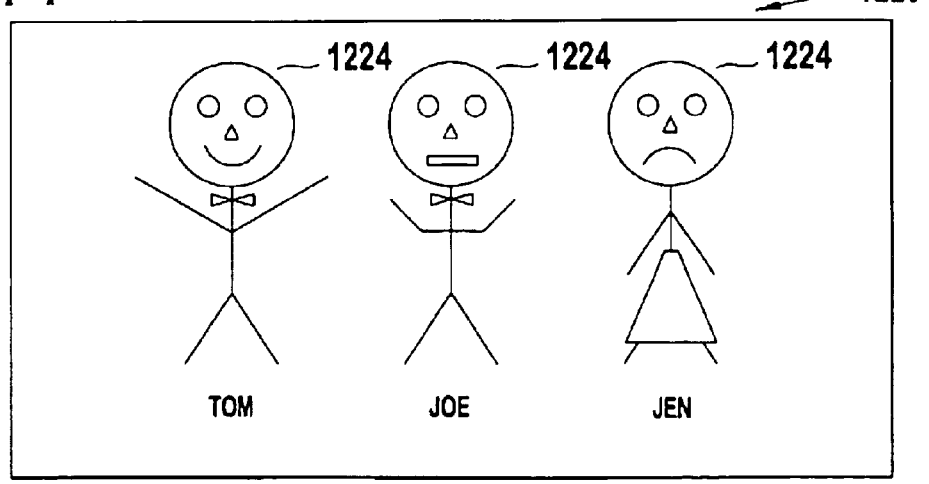
FIG. 14 shows another embodiment of display similar to FIG. 12, in which a plurality of emotigraphics convey emotions such as disinterest or comical activity.
Figure 15:
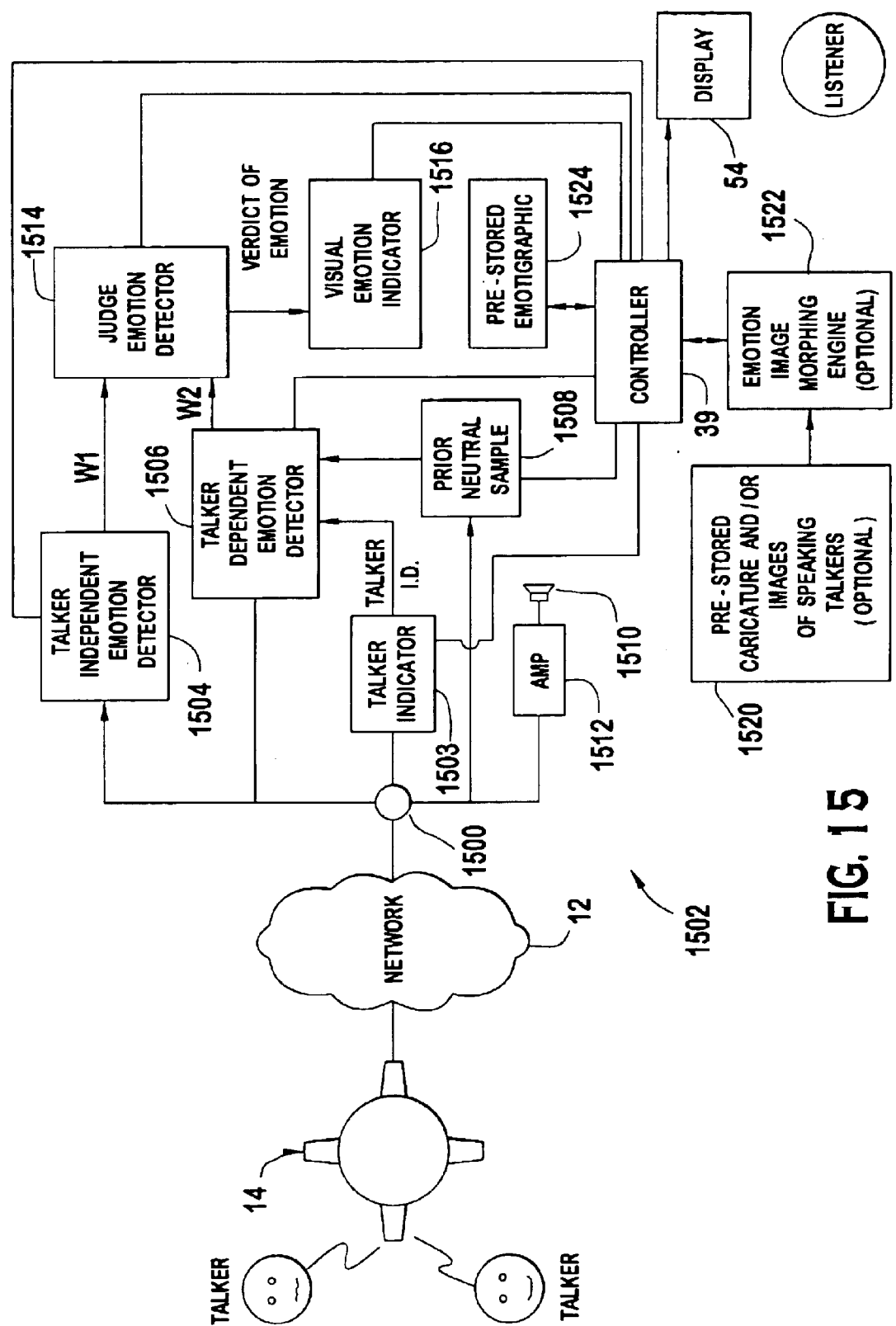
FIG. 15 shows one embodiment of a block diagram of an emotion state indicator device that may be associated with a talker identifier device.

There are multiple embodiments of talker indicators that display the identity of the talker to the listener. In the embodiment shown in FIG. 3, a distinct light (e.g., an indicator portion on a light emitting diode or a liquid crystal display) illuminates the identity of the current speaker. In the embodiment shown in FIG. 4, a portion of a display indicates the name and other information of the talker. In the embodiment shown in FIGS. 5, 6A, 6B, and 7, the voice of the talker can be projected from a distinct spatial location to the listener so that the listener uses the directionality of sound to determine which person, of several, is actually speaking. In yet another embodiment, distinct human-like figures (e.g., stick figures or more detailed human-like figures) as shown in FIGS. 12–14 may be displayed for each of the talkers, and the human-like figure corresponding to the current talker may be highlighted, accentuated, or animated. Different embodiments of talker identifier systems 16, such as shown in FIGS. 10, 11, and 15, can display one or more of such a human-like likeness. Since video corresponding to the entire display of the talkers does not have to be transmitted, the bandwidth of data transmitted to display the identity of the talker can be reduced compared with transmitting complete video images of the talkers.

Different portions of this disclosure describe portions of different embodiments of talker identifier systems 16 that may be located at a) the voice projecting device, and b) the voice capture device. The disclosure also describes certain embodiments of talker identifier systems in which the mental state of the talker(s) is conveyed to a remotely-located listener.

II. Talker Identification System Portions at Voice Projecting Device

This section describes multiple embodiments of talker indicators 32 including the discriminator 36 that identifies the talker to the listener. In these embodiments, the talker indicator is located at or proximate the voice projecting device. The purpose of a discriminator is to identify the present talker from a group of talkers located remotely from the listener. Talker identification information is established by the discriminator, and is used by the talker indicator, and includes the identity of the current talker. In these embodiments of talker indicators described in this section, the talker identification information is generated at the voice projecting device 23.

Certain embodiments of the talker indicator 32 indicate to the listener the identity of the talker who is most likely speaking at any given time. The identity of the talker is displayed on a display in one group of embodiments. The display in different embodiments of talker indicators may be, e.g., a cathode ray tube (CRT) display, a liquid crystal diode (LCD) display, a flat panel display, a high definition television (HDTV) display, a holographic projection, or any other suitable type of display. The display embodiments of the talker indicator 32 are described. In another group of embodiments of talker indicator, the identity of the talker is projected using voice or audio. Talker indicators may include one from the group of an announcement of the talkers name, a musical sequence, a tone, a beep, an alert, a warble, a click, a buzz, or a subsonic pulse.

2A. Talker Indicator Displaying Talkers Identity

There are several embodiments by which the talker indicator 32 can indicate the current talker using different techniques. For example, in the embodiment of talker indicator shown in FIG. 3, a plurality of light emitting diodes (LED) 26, 28, or 30 is mounted on a background 33. The background 33 may include a plurality of nametags 31*a*, 31*b*, 31*c* representing each one of a plurality of talkers. The nametags 31*a* to 31*c* may, e.g., be written manually or in electronic form in fields, and additional information may also be included with each nametag. The display may also exhibit individual biographical information about the talkers. As one talker speaks, the respective LED 26, 28, or 30 corresponding to the nametag 31*a*, 31*b*, and 31*c* for each talker is illuminated. In the embodiment of the talker indicator 32 shown in FIG. 3, the voice-projecting device of the listener may be integrated into the distinct LEDs portions. The talker indicator 32 captures the individual voices of the talkers and conveys the speaking voices to the listener 24. The listener 24 receives and transmits his/her voice communication via, e.g., an integral telephone or audio device.

In another embodiment of talker indicator 32 shown in FIG. 4, a liquid crystal display (LCD) 402 including a talker biography portion 404 and an active talker indicator portion 406. The biography portion 404 includes a plurality of display blocks or regions containing biographical information about each of the potential talkers, including name, title, role, and additional relevant information. The information within the biographical portion 404 may be displayed within a block or icon associated with that particular talker throughout the duration of the entire voice communication. Alternatively, the biographical information may be projected adjacent to a block or icon associated with each talker.

The active talker indicator portion 406 indicates the identity of the active talker and has an indicator corresponding to each one of the potential talkers. Each block of the active talker indicator portion 406 is illuminated or highlighted when that particular talker is speaking. If, for example, "Joe" is currently speaking, then the LCD that is associated with Joe will be illuminated, blink, flash, change color, or exhibit some other "active" indication characteristic. Additionally, the icon or blocks associated with that active talker can be highlighted, animated, or accentuated, using, for example, brightness changes.

In another embodiment, a graphic image associated with each of the talkers can appear in the active talker indicator portion 406. For instance, the graphic image will move its simulated mouth or "gesture" with body parts to indicate that a particular talker is speaking. In another embodiment, each of the different talkers voices are projected from different spatial locations so the listener can identify each talker by the location from which the voice is being spatially projected.

2B. Talker Indicator Indicating Talker Using Audio Techniques

There are talker indicators that do not use any visual display. For example, visual display may be too costly for certain systems or users. Additionally, certain talker indicators may have environmental limitations that preclude the use of a display such as in an automobile. Certain non-display embodiments of talker indicators include talker recognition cues. For example, although each individual voice is unique, similar sounding voices can be slightly altered in various ways to assist in the voice recognition by the listener. One embodiment of differentiating certain talkers accentuating particular voices involves the use of a "nasaling" algorithm, which is a slight frequency shift of one of the talker's voice to better differentiate the voice from another talker's voice. Such nasaling algorithms are especially useful if the talker's voices are similar as perceived by the listener, but distinguishable via the computer recognition algorithm. The frequency shift used to produce the nasaling algorithm is limited so it does not distort the voices significantly but differentiates each voice for easy identification for the listener.

In the systems that do not have a visual display, sounds or audio talker identification announcements can be inserted prior to each spoken voice segment to identify the specific talkers. If a listener is listening to remotely located talkers, the talker indicator 32 retrieves a recorded segment of each talker's voice (i.e., a sound bite). The duration of the sound bite is then compressed while maintaining the pitch of the original sound bite to produce a "regenerated" voice. An announcement is added to the beginning of each sound bite to indicate the identity of the talker associated with that sound bite. The announcement and the temporally compressed sound bite are then played to the listener.

For example, take the case of a listener who is listening to a voice-projecting device 23 that is projecting the voices of two distinct talkers. The voices are transmitted from the voice capture device 14. The voice projecting device 23 projects each voice segment in combination with a short introductory announcement, briefly announcing the identity of that talker. The amount of time necessary to make the brief audio announcement is deducted from the duration of the respective voice segment to provide a continuous dialog of talkers. In one embodiment, the voice segment is temporally compressed while maintaining the original frequency characteristics of the speech for that voice segment. The audio announcement provides short sound bites with the names of the respective talkers incorporated into the beginning of each sound bite. The voice segment of the single speaker is then played back to be followed, or preceded, by the audio announcement. The voice capture device provides for the insertion of the audio announcements.

FIG. 5 shows one embodiment of talker indicator 32 including an announcement storage or generator 502, a voice rate compression element 504, a mixer 506, and an audio portion 508. The announcement storage or generator 502 can store, or generate, the brief announcement of the identity of a talker who is the most likely to have spoken a particular voice segment. That is, the announcement storage or generator generates or retrieves actual announcement voice segment provided by the voice rate compression element 504, forwarded to the mixer 506.

The voice rate compression element 504 allows a voice segment to be projected by the voice projection and identification device 260 at a faster rate to allow for the amount of time necessary for the insertion of the announcement, but still while maintaining the regenerated voice as a continual flow of speech. The voice rate compression element 504 acts to temporarily compress the speech rate of the voice signal while maintaining the pitch of the speech to retain the normal sound of the voice. A complex cepstrum is one commercially available product that may be used as a voice rate compression element that maintains pitch characteristics. The complex cepstrum analysis uses high-quality pitch conversion or speech rate conversion techniques in the analysis-by-synthesis method for actual voice. The operation of one embodiment of complex cepstrum related to speech recognition is disclosed in the book "Musical Applications of Microprocessors", by Hal Chamberlin, Hayden Book Company, Inc., New Jersey, 1980, pp 526–534 (incorporated herein by reference in its entirety).

The above disclosure has described certain portions of the talker indicator as being physically located at either the voice capture device or the voice projecting device. However, it is to be understood that the talker indicator can be considered as a network device (as is the case with any computer network, communication network, or processing system), and thereby can be physically shifted to various positions within the system.

Figure 7:
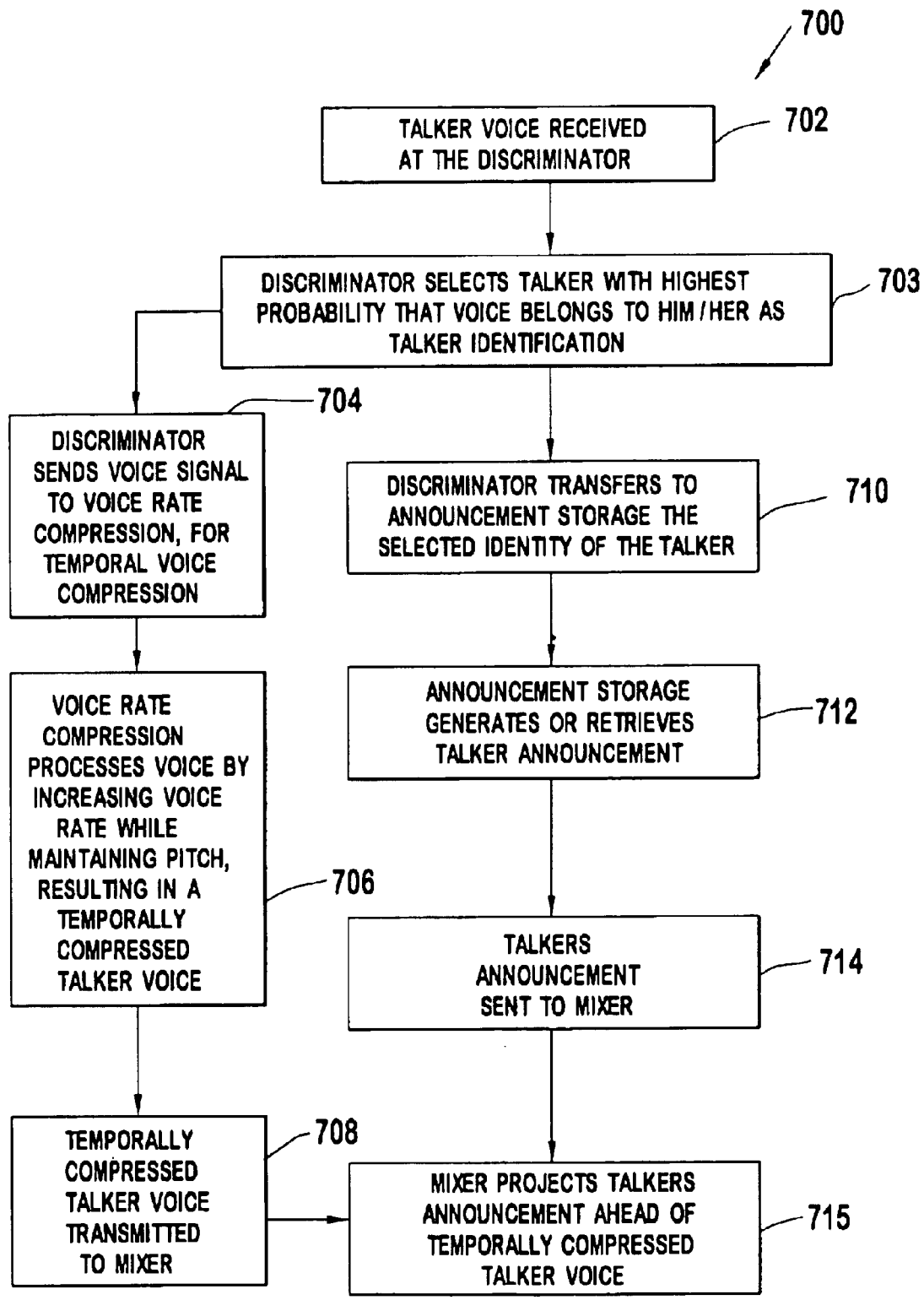
FIG. 7 is a flow chart showing one embodiment of the method of the talker indicator shown in FIG. 5.

The flow chart of a method 700 is shown in FIG. 7 that describes one embodiment of the talker indicator 32 of the talker identifier system 16 that operates in conjunction with the controller 39 as shown in FIG. 5. In step 702, the talker voice signal corresponding to a voice received at the voice capture device 14 is received at the discriminator 36 of the voice-projecting device 23. In step 703, the discriminator 36 selects the identity of a talker from the selected group of talkers that are known to (i.e. stored within) the voice-projecting device 23. Certain embodiments of discriminators 36 store voiceprints corresponding to those talkers who are known or anticipated to be located at the voice capture device 14. The listener may also store selected talkers voices in the talker identifier 32 by initializing a talker when a selected talker is first speaking, then indicating the name of the selected talker by typing the name in on a keyboard or recording an announcement for each talker. The listener then repeats this initialization process for each talker who is going to be received by the voice projection and identification device.

During operation, the talker identifier 32 determines, using voice correlation, the identification of the highest probability voice being received by the voice-projecting device. The discriminator 36 uses the voice correlation to determine the identity of the selected talker, and this information is forwarded to both the announcement storage module and the voice rate compression module. The method 700 continues to step 704 in which the discriminator sends separately the voices of each talker to the voice rate compression element for temporal voice compression. The method then continues to step 706 in which the voice rate compression module processes the voice by increasing the rate of the transmission while maintaining the pitch. Since the pitch (voice frequency) remains the same, the voice sounds substantially the same to the listener as the actual voice of the talker since the pitch is maintained. However, the speech rate is quickened somewhat to allow for the announcement period. The method 700 continues to step 708 in which the temporally compressed talker voice is then transmitted to the mixer. Following step 708, the voice is projected at the voice-projecting device 23 in step 715.

Simultaneous with the processing of the voice as described above relative to steps 703, 704, 706, 708, and 715 as described above; the method 700 (performed by the talker indicator 32 of the talker identifies system 16) also processes the announcement identifying the voice of each talker who speaks as described in steps 703, 710, 712, 714, and 715. Following step 703, the method 700 continues to step 710 in which the discriminator transfers the identity of the talker to the announcement storage 502. The method 700 continues to step 712 in which the announcement storage generates (from the input) or retrieves (from storage) the announcement corresponding to the talker who is presently speaking. The method 700 continues to step 714 in which the talker announcement is sent from the announcement storage to the mixer. In step 715, the voice transmission outputted by the voice rate compression element 504 (in step 708) is inserted sequentially following the announcement produced by the announcement storage (step 714). The combined announcement and slightly compressed voice signal is then output by the voice projecting device to be heard by the listener 24.

The discriminator 36 determines the identity of the talker that will be transmitted to the announcement storage module. The announcement storage module generates or retrieves the announcement of the selected identity of the talker. The selected talker's announcement is then transmitted to the mixer 508 shown in FIG. 5. The mixer 508 projects the selected talker's announcement in temporal sequence with the temporarily compressed talker voice. For example, FIG. 6A shows a typical voice input signal. In one exemplary situation that follows the method 700 shown in FIG. 7, the voice transmission comprises a 20-second time period for Tom's voice communication and a 21-second time period for Jen's voice communication. The total period of time required for the transmission is thus approximately the sum of the total time of Jen's voice communication and Tom's voice communication, or 41 seconds. The announcement for each speaker requires two seconds.

FIG. 6B shows the compressed voice output signal transmission. The transmission includes a 2-second time period for the announcement of Tom's name requires that Tom's voice transmission sound bite be compressed to 18 seconds.

The transmission further includes a 2-second time period for the announcement of Jen's name and a compressed 19-second voice transmission. The required period of time to complete the transmission of both Jen's and Tom's voices including both of their announcements thus remains at 41 seconds. The constant overall time is made possible because of the voice rate compression. The continuous dialog can be maintained without the talker sound bites being temporarily overlapped. In another implementation of this embodiment, for very short duration sound bites, the announcement process can be suppressed and the sound bite passed through the system transparently. In yet another implementation of this embodiment, if sequential sound bites are from the same talker, the announcement may be inserted for the first sound bite from a talker but not inserted for successive sound bites from that same talker.

Figure 8:
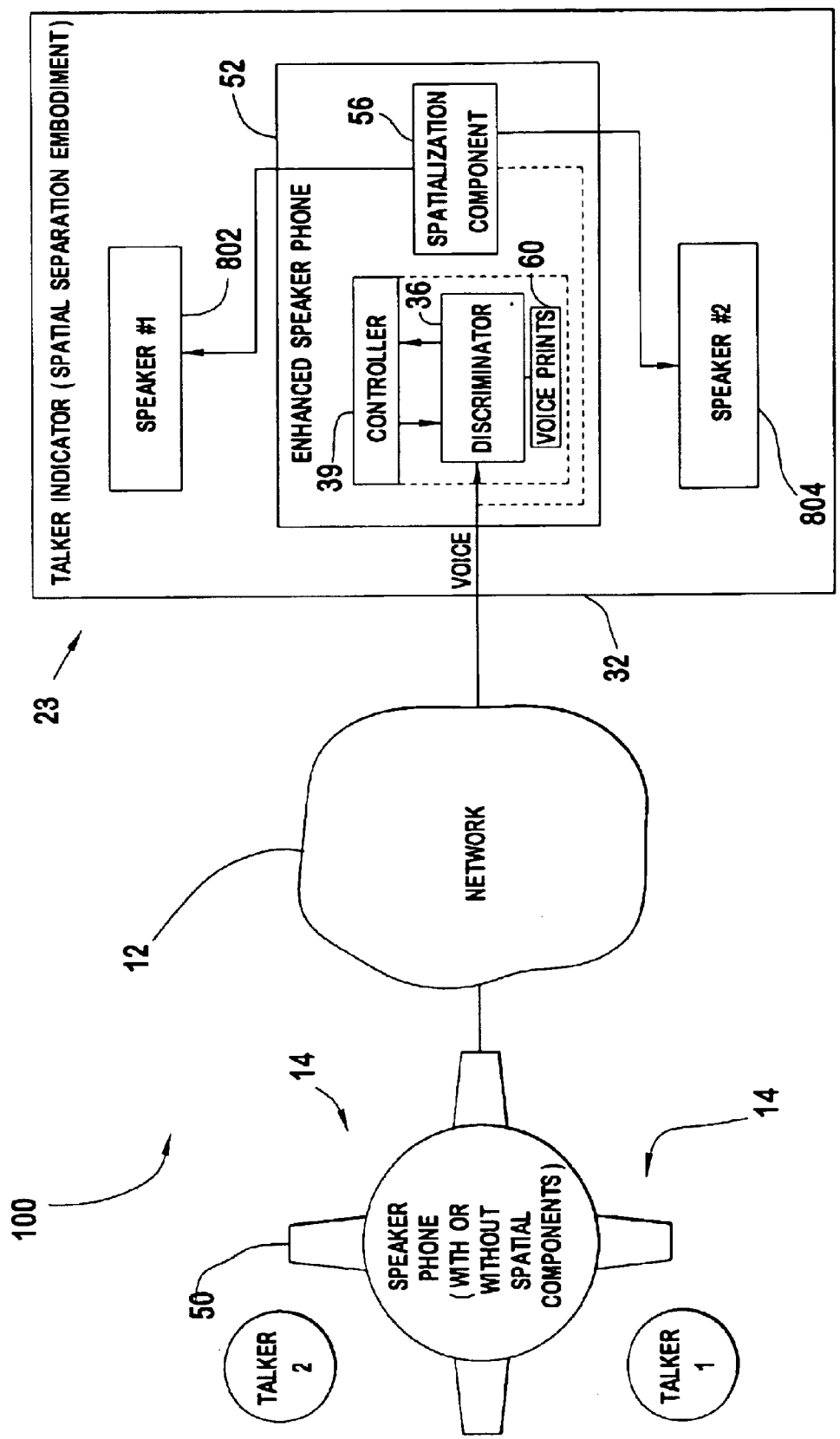
FIG. 8 is a block diagram of another embodiment of a communication system including another embodiment of the talker indicator.

In another group of embodiments of talker indicator 32, the voices corresponding to each talker are projected from distinctly different spatial locations to the listener 24, so the listener can use the directionally of the voice to help identify of the talker. One embodiment of a sound identification system 100 (that uses spatial information to project the voices of the different talkers information are at different locations) is shown in FIG. 8. The sound identification system 100 comprises a standard speakerphone 50 included in the voice capture device 14, a network 12, an enhanced spatial speakerphone 52 included in the voice projecting device 23, and a series of output speakers 802, 804. The system 100 utilizes voice input from a series of talkers to be projected to at least one listener. The standard speakerphone 50 captures the talker's voices. The voice signal transmitted from the voice capture device/speakerphone 50 to the voice projecting device/enhanced speakerphone 52 reflects the voice signal that would be transmitted between two speakerphones.

2C. Talker Indicator Identifying Talker Using Spatial Techniques

In certain embodiments of a talker indicator (located at the voice projecting device 23, the listener differentiates between the voices of different talkers by projecting the voices originating from the different talkers from different apparent locations to the listener(s). As such, the voice from one talker may appear to the listener to originate from the left of, or ahead of, the listener. The voice of another talker may appear to the listener to originate from the right of, or behind, the listener. The apparent location of the different talkers may, or may not, correspond to their actual location proximate the voice capture device. However, the apparent voice separation helps the listener differentiate between the talkers.

The voice projecting device/speakerphone 52 in the embodiment shown in FIG. 8 projects the voices of each talker from a distinct apparent location based on the operation of audio speaker 804 and audio speaker 806. In this embodiment, the voice signal transmitted from the voice capture device to the voice-projecting device may be correlated with the voice prints of each talker. In one embodiment, the voice capture device can spatially separate the voices from each distinct talker. The voices of the individual talkers that are captured from the standard speakerphone 50 and transmitted over the network 12 are differentiated from the voices of other talkers based upon the voice tonal qualities. When the voice tonal qualities are differentiated in the enhanced spatial speakerphone 52, each talker can be assigned a distinct arbitrary location to be spatially projected for the benefit of the listener 24. In another embodiment, announcements can be used to announce the identity of each talker as described above. The enhanced spatial speakerphone 52 may include a standard speakerphone (not shown) as well. The projecting speaker of the standard speakerphone may be alternatively used if the capabilities of the enhanced spatial speakerphone 52 are not desired in a particular call arrangement.

Two, four, or more audio speakers with virtual or quad surround sound processing, respectively, can be provided as audio speakers in the talker indicator. The more sophisticated speakers provide for more accurate voice projection and sound reproduction. An array microphone can be provided for speech capture in certain embodiments. Low bit-rate analog spread spectrum encoding of information can be used to limit accessing of the voice identification information by undesired third parties and provide compatibility existing analog phone systems. Sound coordinate and handshake information on analog voice signals can also be provided. One embodiment of a talker indicator would utilize a computer such as a personal computer (PC) with the quad audio speaker surround card with the stereo sound and processing provided on the computer. It is desirable to include acoustic echo cancellation algorithms in a standard speakerphone to provide a stand-alone conference room capable speakerphone.

In addition, to improve the ability to spatially locate talkers in the listener's environment, speakers in addition to 802 and 804 may be used (nominally 4 or 5 speakers such as in conventional surround sound system) and a standard output signal compatible with such multi-speaker systems may be employed. On implementation would provide, for example, an analog left and right RCA™ jack output carrying a Dolby™ Pro logic encoded matrix surround sound signal that would be connected via conventional means to a consumer Dolby Pro Logic receiver and multi speaker system. Another embodiment could incorporate a SPDIF output carrying 5.1 channel encoded speech that could be connected to a conventional Dolby digital or DTS decoder and multi-speaker system.

One embodiment which incorporates enhancement at the voice capture device takes advantage of the proximity of the talkers to allow for the capture of the actual, or approximation to actual, spatial coordinates of the speakers for transmission to a voice projecting device capable of faithfully recreating this spatial speaker separation. In this case, this spatial information must be passed, (along with optionally other information) to the voice-projecting device 23. It is preferred that this information be encoded in such a manner that the encoded information as transmitted is transparent to a standard telephony device and/or network, but can be passed to and interpreted by, an enhanced speaker phone as described in this invention. Once such encoding mechanism for the spatial coordinates could be, for example, simple low bandwidth spread spectrum encoding of the data that would be interpreted simply as noise by a standard phone, but could be picked up and interpreted appropriately by the enhanced spatial speaker and phone.

The enhanced spatial speakerphone 52 projects the voices of the talkers to make it appear to the listener 24 that the individual voices, corresponding to the voices of the talkers, are coming from different spatial locations. Such a perception results from, in one implementation, altering the volume of the different audio speakers, to indicate that the sound corresponding to the voice of a particular talker is located near to a particular location in the voice projecting device. Other implementations use phase delays, time delays and soundwave interferences to create spatial separation. Further, with a simple calibration from the listener 24, a display 54 as shown in FIG. 8 may be set up to provide a visual representation of the position of the talkers as they speak and move about a conference room.

III. Talker Identification System Portions Located at Voice Capture Device

The portion or portions of the talker indicator that determines the identity of the talker for the listener (i.e., the discriminator) may be located at either the voice projecting device, at the voice capture device, in the network, attached to the network, or distributed amongst any one of these four locations.

3A. Spatialization Information Derived Using Microphone Array

This section describes those embodiments where the portion of the talker indicator that identifies the talker is located at the voice capture device. In these embodiments of talker indicators, the discriminator uses the apparent difference in spatial sources of the different talker voices (as well as the voice characteristics of each talker) to identify the voice of each speaking talker. By comparison, in those embodiments of talker indicators in which the discriminators are located at the voice-projecting device, only the physical qualities of the voice can be used to differentiate the voices of the different talkers. A talker indicator having a discriminator 32 located entirely at the voice projecting device might receive only information relating to the voice of the talkers as transmitted from the voice capture device (i.e., no spatial information, indicating where the different voices are originating, at the voice capture device will be transmitted to the voice projecting device). Since most of the talker identification processing is done at the voice capture device, the amount of data that is transmitted to the voice-projecting device can be relatively small.

In other embodiments of talker indicator, the talker identification information is generated in the voice capture device and the talker identification information is thereupon transmitted from the voice capture device to the voice projecting device, generally in parallel with information signals carrying the voices of the talkers. Producing the talker identification information to derive the identity of the talker requires a considerable amount of processing at the voice capture device (e.g., Fred is the present talker). Transmitting the identity of the talker may be used to trigger a LED display, a LCD display, an announcement, or any other similar type of identification at the voice-projecting device as described above.

One type of talker identification information that is transmitted from the voice capture device to the voice-projecting device indicates the actual spatial location of the talker (instead of or in addition to the identity of the talker). An example of such three-dimensional spatial information is similar to the surround sound systems and technology. In such talker indicators, the spatial information transmitted from the voice capture device to the voice projecting device provides sufficient information for the voice projecting device to indicate to the listener the identity of the talker.

Figure 9A:
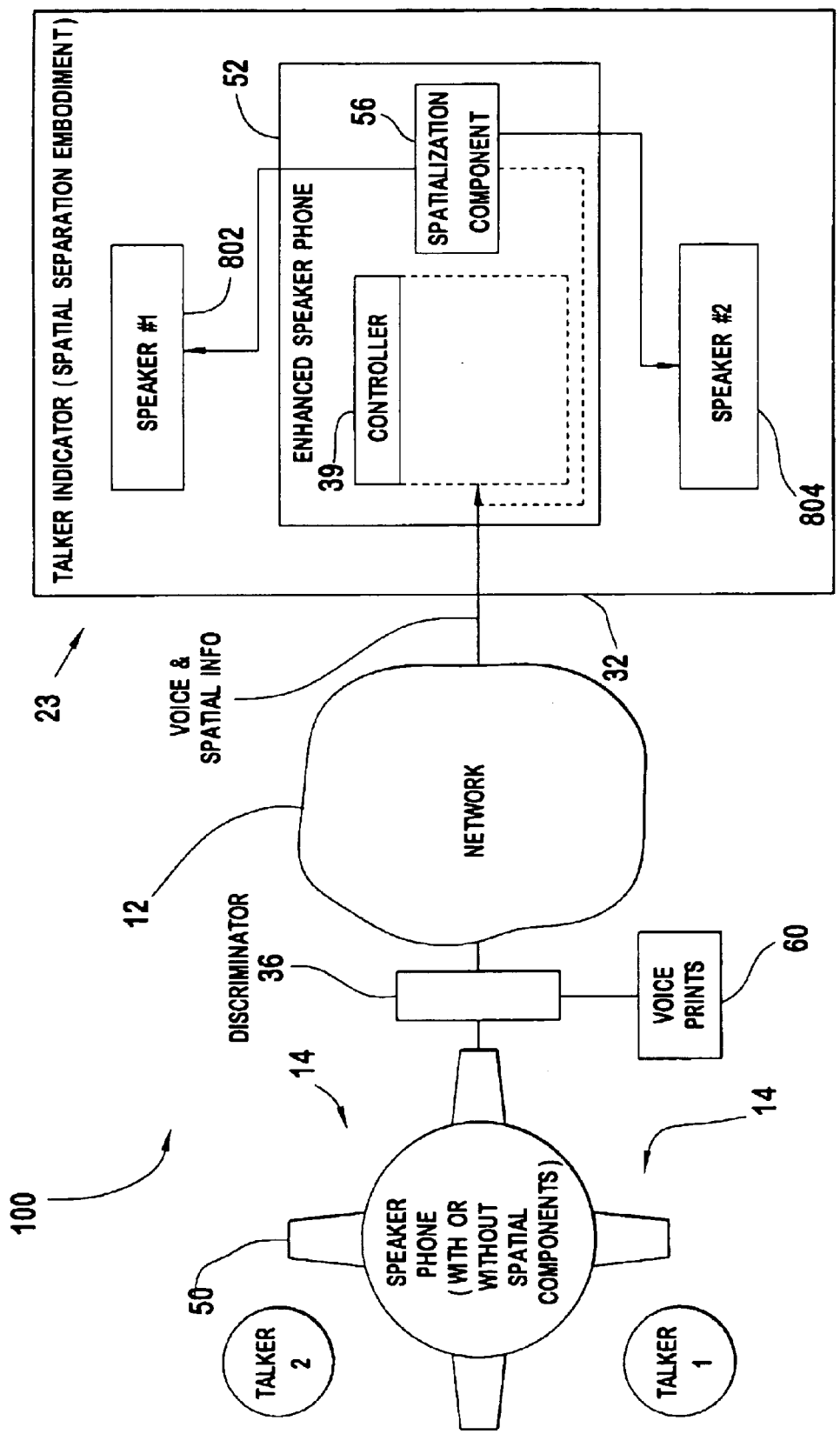
FIG. 9A is another embodiment of communication system including another embodiment of the talker indicator.

FIG. 9A shows another embodiment of the talker indicator 32 in which the discriminator 36 is located next to or within the voice capture device (i.e., the speaker phone 50 shown in FIG. 9A). This compares to FIG. 8 that shows the embodiment of talker indicator 32 in which the discriminator 36 is located in the voice-projecting device. The talker indicator 32 comprises the enhanced spatial speakerphone 52 and a first speaker 802 and a second speaker 804. The enhanced spatial speakerphone 52 comprises a spatialization component 56 and the controller 39. The operation of the discriminator 36 and the controller 39 is similar to that described relative to the embodiment of talker indicator shown in FIG. 2.

Figure 9B:
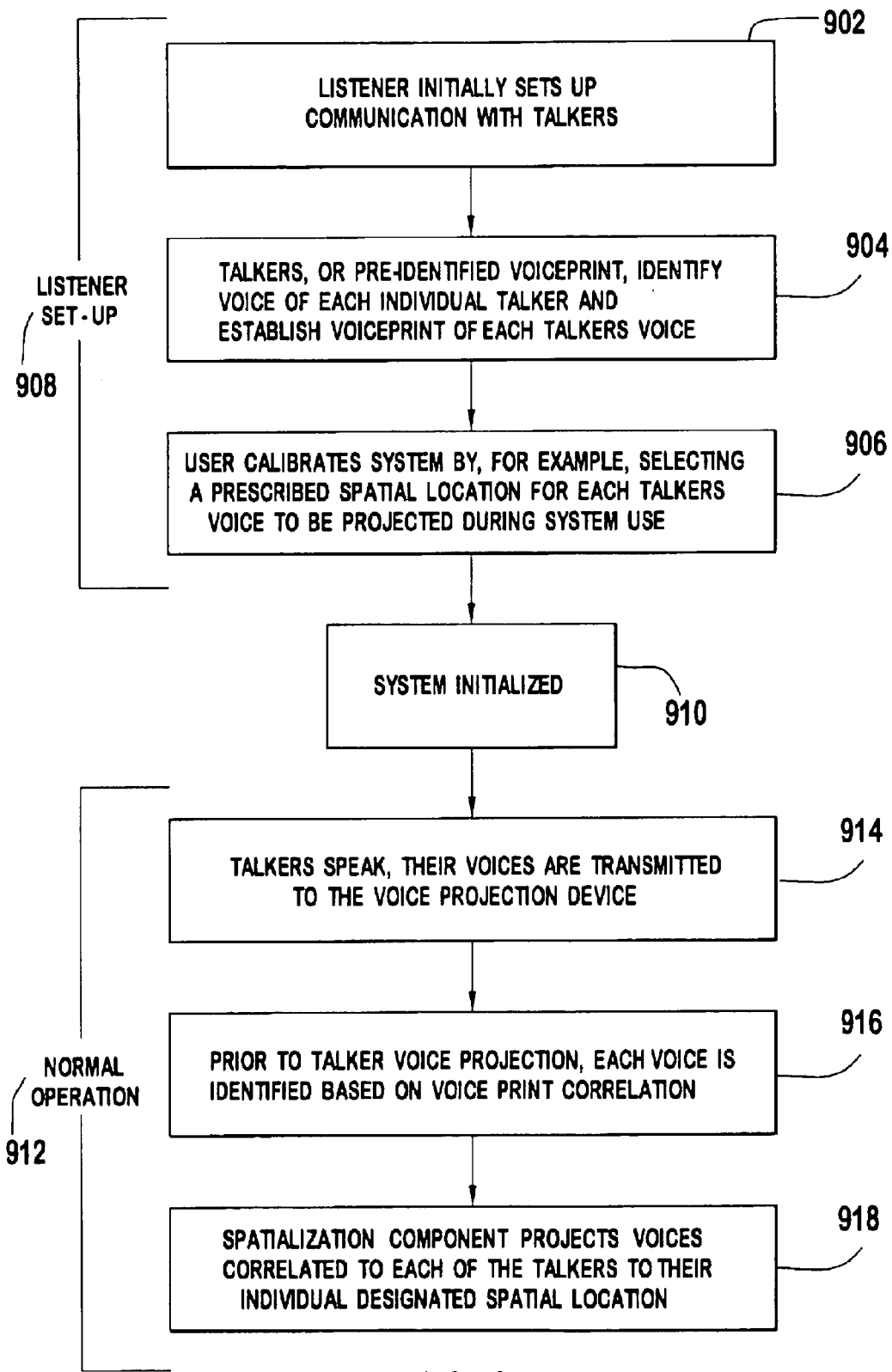
FIG. 9B is one embodiment of a flow chart showing the operation of the talker indicator shown in FIG. 8.

The flow chart as shown in FIG. 9B describes the operation of the talker indicator of FIGS. 9A or 8. Steps 902, 904, and 906 may be characterized as the listener set-up 908. The listener set-up 908 may be obviated by a stored voiceprint such as may be stored in a corporate or private voiceprint database. The method 900 starts with step 902 in which the listener initially sets up the communication with talkers by adjusting the spatialization component 56. Such setting up includes the enhanced spatial speakerphone and spatial speakerphone 52, and the talker indicator 62. The setup entails the listener obtaining a neutral sample of all of the talkers' voices during the initial portions of conversation. Such stored samples, being stored may be considered a voiceprint, a neutral sample, or similar terms, and are typically stored in a codebook (not shown), stored in memory.

The method 900 continues to step 904 in which the talkers identify each of their individual voices to correspond to the voiceprint of each talkers' voice. For example, Talker 1 may talk on the phone introducing himself as Ted,. Talker 2 would introduce herself as Mary, etc. The method continues to step 906 in which the listener calibrates the spatialization component by selecting a prescribed spatial location for each talkers' voice to be projected during normal operation. This is accomplished by the listener by adjusting the spatialization component 56 shown in FIG. 9B, such that the voices of the distinct talkers are projected at different locations between the audio speakers.

Following the listener set-up 908, the system is initialized during step 910. Following step 910, the method continues to the normal operation 912 portion of the method 900. The normal operation 912 includes steps 914, 916, and 918. In step 914, the talkers speak, and when their voices are received the voice capture device converts their voices into voice signals that are transmitted to the voice projecting device. The method continues to step 916, in which prior to the projection of the talkers' voice, each voice signal is identified as belonging to one of the talkers based upon voice print correlation techniques. The voice print correlation techniques compare the voice characteristics of all of the talkers' voices stored in the stored voice prints 60 and compares that to the voice input signal. The method 900 continues to step 918, in which a spatialization component 56 is used to project the voices correlated to each of the talkers to their individual designated apparent spatial location between the speakers.

The spatial locations at which the voices of the talkers are project at the voice projecting device may, but need not be, an accurate representation of the actual location of the received voices of the respective talkers at the voice capture device. The spatial information is used by, e.g., a discriminator to spatially separate the voices of the individual talkers. Such spatial separation of the voices by the spatialization component 56 can be used by listeners at the voice-projecting device to distinguish between the talkers. Spatialization improves the quality of voice perceived by the listener 24 since the spatialization component 56 helps indicate to the listener the distinct identity of each talker.

In one embodiment, a sound spatializer device can be located at both the voice capture device (to accurately capture the spatial locations of the voices) and the spatialization component 56 located at the voice-projecting device (to accurately project the spatial locations of the voices). Under these circumstances, the determination of the speakers voices by a sound spatializer device located at the voice capture device can accurately transmit the realistic relative location of the talkers voices to the spatialization component 56 to accurately indicate the relative physical location at which the voices were captured. A sound spatialization system including the spatializer device and the spatialization component 56 can present an actual representation of the voices and spatial locations at the voice capture device. In addition to voices, the sound spatialization system may be provided in combination with an actual image, or part of an image, transmitted by a video camera or teleconferencing system.

In voice/video teleconferencing applications, spatialization provided by at least two-dimensional spatialization equipment processing at both the voice capture device 300 and the voice-projecting device 400 allows for the relative locations of the different talkers to be accurately reflected (both in voice and in video) to the listener. However, if a listener voice calibrator at the voice projecting device 400 is to accurately spatially separate the voices of the different talkers, the spatial equipment must be provided at both the voice projecting device and at the voice capture device.

In certain embodiments, figures that display different ones of the talkers speaking can be displayed as computer generated figures. The computer generated figures of the talkers can include an image of a part of the talker, such as a photograph of the face of the talkers projected over an animated body. In addition, emotions of the talkers can be illustrated using computer-generated techniques for each of the talkers. Computer generated figures (as illustrated in FIGS. 12–14), represent each of the talker in a manner that is configured to illustrate emotions of each respective talker is referred to in this disclosure as an "emotigraphic." Since the image of the three talkers is not being transmitted in these systems as is the case in teleconferencing systems, the bandwidth required to transmit the displayed image is reduced considerably or to zero in the case of a receive side only implementation.

In voice/video conferencing applications, similar techniques as described above can be applied relative to the voice spatializer. The importance of the actual physical location of the talker relative to the apparent location of the emotigraphic appearing on the display screen increases. For example, if one talker appears to the right of another on a video screen to a listener positioned proximate the voice projecting device, then the voice corresponding to the talker on the right should be similarly projected to the right as witnessed by the listener.

Large corporations could develop voice print libraries of their employees, outside consultants, contractors and customers to be located at the embodiment of voiceprints portion 60 shown in FIGS. 8 and 9A. These voiceprint libraries could be accessed by the device so that the database mapping can be automatically performed anytime a conference call occurs between any of the listed parties In one embodiment, the listener 24 initially sets up communication with the series of talkers. Accurately depicting the spatial location of the voices of the talkers to the listener at the voice-projecting device is especially important in those instances where the listener is provided with a visual display of the talkers. However, accurately depicting the spatial location of the talkers voices can also be useful in those systems without displays. The listener, or the person calibrating the system, may position the spatial locations of the talkers at distinct spatial locations to help the listener differentiate the talkers. For example, at the beginning of the conversation, one talker (Tom) states his name, and the listener may decide to have Tom's voice be projected at certain spatial location relative to the other talkers regardless of their actual spatial location. The listener 24 then calibrates or configures the system by using the talker spatialization input device 58 as shown in FIGS. 8 and 9A to select a prescribed spatial location for Tom, either at a location that corresponds to the actual physical positions of the talkers or, alternatively, the most convenient spatial locations from which the talker voices can be differentiated. A joystick or any other input selection device may be used to select the prescribed spatial locations.

One embodiment replicates the actual spatial location of each of the talkers without precise spatial information being transmitted from the voice capture device to the voice-projecting device. This is done, in those embodiments shown in FIG. 8 or 9A by relying on an oral estimate of the spatial information being provided by one or more of the talkers. Each one of the series of talkers identifies themselves by stating his/her name and where the talker is located with respect to the other talkers. The talkers may volunteer their physical positions to the listener. For example, a first talker "Tom" may state "I am located 10 feet to the left of Joe". The next talker Joe states his name, and further states "I am located 10 feet to the right of Tom and 10 feet to the left of Jen". The listener 24 then calibrates the system by using the talker spatialization input device 58 to select a prescribed spatial location for Joe. The last talker Jen states her name "Jen" and further states "I am located 10 feet to the right of Joe". The listener 24 then calibrates the system by using the talker spatialization input device 58 to select a prescribed spatial location for Jen. In this manner, the listener may observe the physical location of each one of the talkers, and as each talker speaks, the listener may "position" the source of that talkers voice to a location that corresponds to their image on the display. The listener 24 set-up is completed using these spatial positioning techniques. By comparison, in those embodiments shown in FIG. 9A, the actual spatial separation of the talkers, as determined by the discriminator 36, can be transmitted as spatial information to the spatialization component, and either the actual spatial information can be used to set the apparent location that the talkers voices appear to originate to the listener, or the listener can reset the spatialization component 56 to position the apparent talkers' voices relative to the listener at desired locations.

In certain embodiments of talker indicator 32, the voices of the talkers may be used to generate their voice samples or voiceprints during the initial set-up (particularly if the voice samples or prints are not already stored). The voiceprint is then stored in the stored voiceprints element 60. The enhanced spatial speakerphone 52 is then initialized by the listener 24. Under normal operation, the talkers speak and their voices are transmitted over the network 12 to the enhanced speakerphone 52. Each voice is directed to the talker indicator 62 that accesses the stored voiceprints element 60 for voice print recognition. Each voice in the transmission is identified based on voice print correlation that is executed by the talker indicator 62. The talker indicator 62 transmits the identified voice of each talker to the spatialization component 56. The spatialization component 56 projects the voices correlated to each of the talkers over the speakers to their individually designated spatial locations.

In those embodiments where spatialization equipment is located both at the voice capture device and the voice projecting device as shown in FIG. 9A, and the spatial location of the talkers is not "fixed" or static, a talker may move around the room while speaking and still have his/her voice spatially projected by the spatialization component 56 to the listener from the same prescribed location. Similarly, once calibrated by the listener 24, the optional display 54 may be used to display the individual reference locations of the talkers. The displayed location of the position of each talker will not be effected even as one or all the talkers get up and walk around the room while speaking simultaneously.

The numbers of spatial locations available for projection in a particular embodiment are dependent upon the system parameters. For example, if one audio speaker 802 is located to the left of where it is desired to make the talkers voice originate and another audio speaker 804 is located to the right of the intended position of the talker, the audio speakers can be relatively amplified to provide the impression to the listener that the voice is coming from in between those two audio speakers using known spatialization techniques. If the two audio speakers 802, 804 are amplified evenly, the listener may have the impression that the voice is being projected at a location dead center between the speakers. One of the audio speakers 802, 804 can be amplified (e.g., with a 75/25 loading) to provide the impression that the voice is originating from one side of dead center between the speakers. If power is applied from only one of the audio speakers 802, 804, then the listener gets the impression that the voice of the talker is originating from the location of that speaker. Varying ratios of amplitude, phase and delay can provide the impression that the voice of the talker(s) are originating from different spatial locations for the talkers. One method of providing additional positional cues to the ear for virtually locating talkers is covered by the theory of Head Related Transform Functions (HRTF).

Multiple embodiments of talker identifier systems including a talker spatialization determiner 1010, located at the voice capture device, are now described as shown in FIGS. 10 and 11. The talker spatialization determiner 1010 accurately determines the relative spatial positions at which talker voices are spoken. In those embodiments of talker identifier systems that do not have a spatialization determiner 1010 at the voice capture device, the listener at the voice projecting device can only rely on conversation from the talkers at the voice capture device to indicate accurate positioning of the talkers. Typically, under these circumstances, the listener does not wish to accurately reflect the actual positioning of the talkers, but instead will position the projected voices at the voice input devices at positions to separate the voices to maximally assist talker identification at the listener end.

The use of the talker spatialization determiner 1010 at the voice capture device allows a talker identifier system to faithfully reproduce the accurate locations of those speakers to a remotely located listener. In the embodiment of talker spatialization determiner at the voice capture device shown in FIG. 10, audio microphones 1012 are positioned proximate the talkers. In the embodiment of talker spatialization determiner 1010 at the voice capture device shown in FIG. 11, a microphone array (e.g., that are arranged as a simple beamformer to determine spatial information of the voices of the talkers) is positioned proximate the talkers. In both embodiments of talker spatialization determiner 1010 shown in FIGS. 10 and 11, the different talkers are sufficiently physically separated relative to the speakers of the microphone array to limit confusion as to their identities.

In the embodiment of talker spatialization determiner 1010 shown in FIG. 10, one audio input microphone positioned at the voice capture device could be exclusively devoted to each talker. A multi-channel (e.g., a two-channel) interference spatialization circuit that can be integrated in an audio input microphone in the talker spatialization determiner 1010 to provide sufficient spatial separation between the talkers so the voices projected by the different talkers at the voice projecting device appear at different locations.

Multi-channel sound can be compressed wherein you can actually send each of the talkers voices in a compressed form using a compression algorithm such as Dolby™ AC3, that provides for a plurality of (e.g. five) channels. This use of multiple channels provides for a plurality of talkers, each talker utilizing an independent channel. This embodiment doesn't necessitate the use of the sub-band and so forth. The voice projecting device and the compression algorithms can be used together to help identify the talkers using audio spatialization techniques. Using an off the shelf Dolby™ AC3 compressor, and providing an audio input from each one of the talkers microphones, up to five adjacent, and on the receiving side using a standard off the shelf Dolby™ decompressor/receiver, the identity of each one of those actual talkers located at a different position would automatically be activated at the appropriate time.

When each talker speaks, it would show up relative to one or more speakers at the voice capture device. Certain embodiment could be used to transmit a compressed audio stream over the network. There are a variety of compression algorithms (e.g., G-series compressors and companders) that can provide a relatively low data rate to transfer voice information. One simple voice/data system that can be utilized to support the invention is the currently standardized simultaneous voice and data modem (SVD). The SVD standard is used in many V.90 modems readily available today. Locating the audio input microphone adjacent the talker (when a particular talker is speaking) provides excellent spatialization since other talkers are physically separated from the audio input microphone. It therefore appears to the listener as if the projected voice is originating from a distinct location (perhaps associated with one or more audio speakers at the voice projecting device) associated with the talker. The audio input microphone that is devoted to a particular talker will only be actuated when that talker is speaking. Therefore, an audio output speaker associated with a particular audio input microphone would only project the voice(s) received by that audio input microphone.

This system can also be used in an embodiment to eliminate the need for speaker recognition (discriminator), since a unique voice to person association is made at the location of the talker and sent via data sub-band to the projection device/listener or terminal end. Using multi-audio input microphone systems in the talker spatialization determiner 1010 (where a plurality of audio input microphones are devoted to each talker) can be used by the talker identifier to provide better spatialization at the voice-projecting device or better talker identification by previously mentioned means including LED display, LCD/CRT display and emotigraphic. By comparison, the surround-sound effect at the voice projecting device produced by embodiments where a plurality of audio input microphones surround all of the talkers can be improved by providing phase differential between two audio input microphones that are near the talker so the sound can be made to apparently originate from that direction. This phase difference can be mirrored by using relative loading between the speakers located at the voice projecting device or related HRTF and spatialization techniques.

In the embodiment of talker spatialization determiner 1010 shown in FIG. 10, the voice of the talker can be taken and provided to the receiver/listener on the primary voice channel while the talker identity information is sent in a sub-band for example, a spread-spectrum signal. The audio speakers 802, 804 at the voice projecting device can be driven so the speaker associated with any talker (or the spatialization algorithm) is going to direct the sound to the position at the voice capture device where the voice of the talker is to be projected to the listener.

In a conference situation, talkers typically do not talk over each other too much. In certain embodiments of talker identifier systems, such as where certain talkers are located at different voice projecting devices, individual talkers may speak over each other. To limit the effects of talkers speaking over each other, any combination of separators can be used. In the embodiments of talker identifier systems using the talker spatialization determiner 1010 shown in FIGS. 10 and 11 the discriminators are located at the voice projecting device. At the voice projecting device the talkers can be differentiated based on calibration of where each talker is physically located. A listener at the voice capture device can spatially position the apparent location of the voices of the talkers at the voice projecting device at the desired locations. In each of these mechanisms a talker is located at each seat that uses the spatialization algorithm.

3B. Spatialization Information Derived Using Beamformers

FIG. 11 shows an embodiment of talker indicator 32 positioned at the voice capture devices 14 to derive spatial positioning of the talkers. The talker indicator 32 utilizes talker spatialization determiner 1010 that relies upon a beamformer 1102 to derive spatial information about the originating location of the voice of the talker. Beamformer technology was developed relative to SONAR to obtain range and positional information about ships and submarines in the ocean. The talker indicator 32 also includes a talker locating portion 1103 that determines a spatial position of the talker relative to the beamformer 1102, and a talker identifier portion 1104 that asks to identify the talker. The talker location portion 1103 includes a detect location coordinates portion 1105. This talker identifier portion comprises a pre-detect speaker identifier portion 1106 and a talker emotion determiner 1108. Both the talker locating portion 1103 and the talker identifier portion 1104 output to the final detect talker 1110. The beamformer typically includes one primary microphone 1120 and a plurality of secondary microphones 1122.

In the embodiment of FIG. 11, a plurality of distinct microphones are not used at the voice capture device as with the embodiment of FIG. 10. Instead a microphone array (e.g., a beamformer) is applied at the voice capture device. Beamforming is related to tracking as well as localization. Beamforming uses a primary microphone 1120 and a plurality of secondary microphones 1122 in the beamformer microphone array. The purpose of the primary microphone 1120 in beamforming is to obtain audio (i.e. voice data) of a sufficient quality so that the various talkers can be identified. The purpose of the secondary microphones 1122 are to determine where the sound of the talker is originating. The secondary microphones 1122 are arranged in an array pattern, and are typically separated by a uniform distance along a single plane 1128. The secondary microphones 1122 receive the voices from a talker, where the time delay of the signal is related to the speed of sound divided by the distance between the talker (e.g., Tom) and the microphone.

A distance from the talker to the upper most secondary microphone 1122 is indicated by 1130(*a*), and a distance from the talker to the next lower secondary microphone 1122 is indicated by 1130(*b*). Based upon the difference in time that it takes a voice signal to travel from Tom to the top two secondary microphones 1122 shown FIG. 11, computational equipment associated with the beamformer 1102 can determine geometrically the distance that Tom is distanced from the two secondary microphones 1122 (as indicated by the angle alpha between the lines 1130(*a*) and 1130(*b*), and the relative angle $\beta_1$ and $\beta_2$ between the plane 1128 and each of the respective lines 1130(*a*), 1130(*b*)), at the upper two respective secondary microphones 1122. While the position of the talker is described according to the upper two secondary microphones 1122 in the embodiment of FIG. 11, it is envisioned that all of the secondary microphones 1122 will be used by the beamformer 1102 to enhance the precision of positioning the talker. As such, the beamformer can accurately be used to determine the position of a talker relative to the beamformer 1102.

The upper signal from all of the secondary microphones 1122 is sent over a multi-microphone voice conductor 1124 to the location coordinate portion 1105. The location coordinate portion 1105, under the influence of the controller, operates the beamformer to determine the spatial location of the talker relative to the beamformer 1102. The number of secondary microphones associated with each beamformer 1102 is typically relatively large. The multi-microphone voice conductor 1124 is relatively large compared to, for example, the mono voice conductor 1126 that transmits the signal of the primary microphone 1120 to the pre-detect speaker identifier portion 1106 and the talker emotion determiner (optional) 1108. The talker emotion determiner 1108 determines the mental state of the talker as will be described relative to the embodiment of emotional state indicator 1502 shown in FIG. 15. Note again that the location of the various processing components can be at capture, network, or projection sides of the system, constrained only by efficient usage of available network bandwidth.

The pre-detect talker identifier portion 1106 receives its voice signal from the primary microphone 1120 of the beamformer 1102, and may be considered to be structurally and operationally similar to the talker indicator 32 described herein. As such, the pre-detect speaker talker identifier portion transmits the identity of the talker during normal operation to the final detect talker portion 1110 over conductor 1132. The location coordinates portion 1105 transmits the position and range of the talker relative to the beamformer 1102 over conductor 1134 to the final detect talker 1110. The talker emotion determiner portion 1108, if installed, transmits the mental state of the talker to the final detect talker portion 1110 over conductor 1130.

Certain embodiments of beamformers 1102 allow for electronic focusing, or steering, of the beamformer so that once the general location of the talker is determined, more precise positional information can be determined by steering the beamformer since beamformers 1102 obtain the best positional information by comparing times of the relative temporarily narrow portion of signals as received by a plurality of secondary microphones 1122. Therefore, instead of having to continually analyze all of the input data, the beamformer 1102 can wait for a desired time when it is receiving such a narrow signal from the talker. The primary microphone 1120 is often also used during the steering process of the beamformer 1102. Steering the beamformer relates to determining where sounds are most likely to originate relative to the beamformer.

A Kalman filter, or other adaptive filter, is used in certain embodiments to steer the microphone array of the beamformer 1102. The Kalman filter is not shown in FIG. 11, but is typically integrated in the software of a controller that steers and monitors the signals received by the beamformer 1102. Kalman filters and adaptive filters are known in signal processing arts, and these filters are described in many texts relating to adaptive filters and filters in general. Kalman filters are used in tracking applications, and by analyzing the results of that adaptation you can derive coordinates. Kalman filters are known to optimize signals or minimize errors of signals. The beamformer 1102 can be steered to the location in which it is believed that the talker is speaking. As such, the beamformer can suppress the transmission of superfluous signals by steering to the position of the talker.

By integrating a Kalman filter in a steerable beamformer, a least means squared focus analysis can be used to optimize the microphone array in terms of delays. As such, this focuses the receive directionality of the beamformer to most effectively receive noises originating in a particular direction (e.g., from talker). By running a Kalman filter algorithm the beamformer can start to focus on a beam and drive the array to be directional in a particular direction. This directionality of beamformers enhances the actual quality of the voice received from the talkers. Locating beamformers within a car, airplane, or noisy building, for example, provides the ability for the talker spatialization determiner 1010 to adaptably direct the beamformer to receive a talker's voice so it can suppress outside noise and provide a clearer capture of a voice. By enhancing it's directional microphone, the beamformer doesn't have to be located close to the mouth of the talker, and the beamformer adapts to the primary source of sound. One of the other benefits of that is that the listener or talker can either steer it from the controller, or, by using the adaptive filtering/steering techniques of, e.g., Kalman filters, it can steer itself. The beamformer can thus be driven (or adaptively drive itself) to derive audio information on the coordinates on which it steers.

In this application, the Kalman filter maximizes signal return based on directionality of the beamformer. The point at which you maximize signal return happens to be the same as the point where the sound came from.

IV. Transmission of Likeness and Emotion of Talker

The above disclosure relates to multiple embodiments of talker identifier systems in talkers that are speaking can be identified by providing displays having an indicator (e.g., light) of the talker, altering the voices for the different talkers, providing announcements identifying other speaking talkers the is inserted prior to the voice of that talker, and other such embodiments. Another embodiment of talker identifier system is now described in which the listener receives a likeness 1224 representing each talker that may be speaking. For example, FIGS. 12 to 14 each illustrate a display 1220 (that may be a LCD display, a CRT display, a three-dimensional projection or display, a holographic display or projection, or the like) in which representations of talkers are provided on the display.

While the likeness 1224 of the talkers are illustrated in the figures as being stick-figures, it is envisioned that the speaking talkers may be as detailed or complex as desired by the listener(s) and allowed by the utilized display, spatialization, and network technology. Providing displays for the talker identification system having a likeness that is speaking often makes listening to the talkers more interesting to the listener than, for example, listening to the voice with some indicator representing the talker (especially in the conference call situation). In relatively simple systems, to indicate that a particular talker is speaking, the portion of the figure (displayed to the listener) that corresponds to the lips may be opened, moved, or morphed to simulate the talker speaking. In more complex situations, the likeness of the speaking talkers can be moved across the display (indicating motion).

Using the likeness of the talkers as illustrated in FIGS. 12 to 14 has several benefits compared to using full images of the talkers. The equipment necessary to transfer the images is considerably simpler, less expensive, and requires less bandwidth than the equipment necessary to transfer full images. Some of the bandwidth that would otherwise be used to transfer the full images can instead be used to transfer a higher fidelity voice, more precise spatialization information indicating where the different voices are originating, and other useful information.

Furthermore, these embodiments of talker identifier systems that project the likeness of the talker instead of the image of the talker may be useful relative to privacy, travel, and work-place concerns. This becomes even more apparent as a greater percentage of the work-force is working full time, or part time, out of their homes than in past decades. A person giving a presentation with other individuals over these types of talker identifier systems does not have to be concerned about their personal appearance (or the appearance of their work-space) as the same person likely would have to be if they were projecting a full image of themselves. Theoretically, a person could give, or be part of, a formal presentation over the talker identifier system wearing informal clothes. The figure displayed to the listener(s) could be provided with selected appropriate clothes, as by the listener. As such talker identifier systems become more commonplace, the amount and quality of the interaction between business individuals (or other individuals) improves, the number of personal meetings between these individuals increases, and the expenses and time associated with travel and time corresponding to these meetings can decrease.

4A Display of Emotions

One advantage of providing a talker identifier system that displays a likeness to the listener (and watcher) is that emotions and human activities can be provided as desired by the listener(s). As such, certain embodiments of talker indicators may be used not only to describe which talker from a group of talkers is presently speaking, but also to describe the emotional state of the talker using the displayed computer generated figures referred to as emotigraphics. FIGS. 13 and 14 show one embodiment of a computer display such as may exist on a computer monitor, television, flat panel display, display on the cellular telephone, or any other such display that displays emotigraphics. Emotigraphics may represent the emotion, facial speaking shape (e.g., open mouth) appearance, attitude, activity, or other such aspects of various people. Emotigraphics may indicate, in addition, the location of the various talkers around a room. Such locating could used in conjunction with the spatialization techniques described above. The emotigraphics may include a group of iconic graphics, caricature graphics, emotigraphics, alphanumerics, graphics, digital photographics, animated graphics, hybrid digital photographic and caricatures, text blocks, and combined text and graphics.

One embodiment of an interface could include a three dimensional representation of the talkers located about a conference table, or in a similar setting. The interface would allow for the selection of an appropriate emotigraphic for each one of the talkers (male, female, heavy, thin, etc.). The display for each emotigraphic could optionally have a name or other information fields displayed below the emotigraphic. During operation, as one of the talkers speaks, the corresponding emotigraphic is highlighted in some fashion. Optionally, the emotigraphic includes facial and body animation associated with the act of speaking. The emotigraphics could include photographic images of portions of the talkers (e.g., the faces). The photographs of the talkers can be integrated if the photographs are provided in advance and the software may optionally support conformal mapping of the photographs to the optionally three dimensional computer emotigraphic forms, or primitive implementations can utilize 2D facial overlay with other embodiments also including facial morphing to effect lip, eye and facial muscle movements. Emotigraphics may undergo a variety of motions including, but not limited to: animating, highlighting, enhancing, embellishing with text, blinking, morphing, flipping, rotating, changing the color of, changing the intensity of, animating the subcomponents of, changing the apparent emotional state of, and animating the mouth of the talker.

For example, if the emotigraphic for Tom is shown to the left of the emotigraphic for Joe in FIG. 14, then the voice spatialization should also indicate that when the talker represented by the emotigraphic for Tom is speaking, then the voice generated by the spatialization techniques will appear further to the left of the listeners in the room than when the talker corresponding to the emotigraphic for Joe is speaking. Emotigraphics can be generated with different levels of sophistication. At its most rudimentary level, emotigraphics can be configured as stick figures, or the emotigraphic can be provided in much more detail. In emotigraphics, some type of facial expression, mouth, eyes, etc. are visible to the listeners by which the listener can gauge the mood of the talker. As a talker who is represented by a specific emotigraphic speaks, the talker indicator (be it physically located at the voice capture device, at the voice projecting device, or at some third location or combination thereof) will be able to identify the voice as the most closely correlated talker. Such techniques as voice prints, speech recognition programs, etc. are used to generate the emotions as displayed by the emotigraphics.

FIG. 15 shows one embodiment of emotional state indicator 1502 including a talker indicator that can be used to indicate identity and the emotional or mental state of the talker. The emotional state indicator 1502 includes the talker indicator 1503, a talker independent emotion detector 1504, a talker dependent emotion detector 1506, a prior neutral sample device 1508, a voice output 1510 associated with an amplifier 1512, a judge emotion detector 1514, a visual emotion indicator 1516, an optional initial or pre-stored caricature an/or image of talkers 1520, an optional emotion image morphing engine 1522, the controller 39, an optional pre-stored emotigraphic 1524, and the display 54.

The emotional state indicator system 1502 operates as follows. The voice signal is received over the network by a splitter 1520. The splitter 1520 splits up the voice signal, and presents a voice signal to the talker independent emotion detector 1504, the talker dependent emotion detector 1506, the talker indicator and the voice output 1510 via the amplifier 1512. The talker indicator is configured, and operates similar, to the other embodiments of talker indicator described above. As such, a talker indicator outputs the talker identifier information that indicates the identity of the talker to the talker dependent emotion detector 1506.

The prior neutral sample device 1508 receives, and stores, a sample of each of the talker's voices. The talker dependent emotion detector 1506, which has received the identity of the present talker who is speaking from the talker indicator, also receives the voice signal directly over the network via the splitter 1520, and also receives a prior neutral sample from the prior neutral sample device 1508. The talker dependent emotion detector 1506 thereby compares the talkers voice with the prior neutral sample of their voice, determined at, e.g., the beginning of the session when the talkers first introduce themselves. Since the prior neutral sample is determined when, for example, the talkers first introduce themselves, the voice is assumed to be in a relative relaxed state (in most cases). For example, when individuals first introduce themselves over a phone, the voice is usually not agitated, not extremely happy, not extremely sad, but instead at a relatively neutral mental state (in most instances).

The prior neutral sample can also be obtained at some other time during the telephone conversation. For example, the listener may select some time in the middle of the talker's conversation when it is believed that the talker's voice is in a relaxed state. Alternatively, the sample may be taken over an extended duration so the prior neutral sample device 1508 can statistically determine the neutral sample of that particular speaker. Additionally, the neutral sample can be retrieved from a call history database or a corporate server.

Figure 16A:
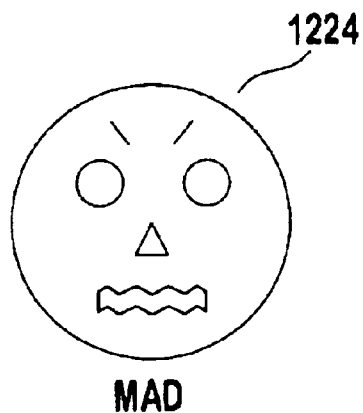
FIG. 16A shows one embodiment of a face of an emotigraphic of the type shown in FIGS. 12 to 14 displaying an angry or mad face or likeness.
Figure 16B:
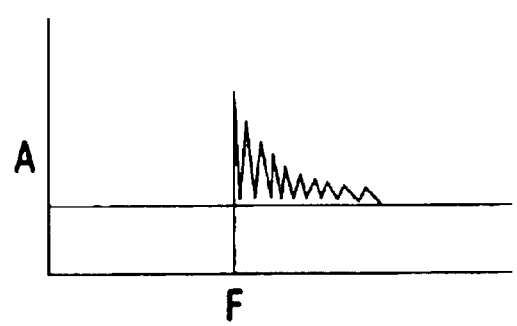
FIG. 16B shows an exemplary amplitude versus frequency graph plotting a talkers voice that might produce an emotigraphic face or likeness similar to as shown in FIG. 16A.

The talker dependent emotion detector compares the prior neutral sample obtained from the prior neutral sample device 1508 to the voice signal transmitted over the network, by using a correlation program. For example, if the talker is mad as shown by the emotigraphic face or likeness 1224 in FIG. 16A the voice will likely be louder than if the talker is speaking in their normal voice. There will also likely be a shift to higher frequencies as shown in FIG. 16B. This frequency shift occurs because the more agitated voice will have more sharp edges, and therefore, there will be more higher frequency harmonics in the main analysis of the voice.

Figure 17A:
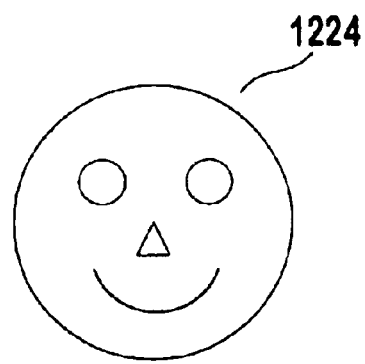
FIG. 17A shows another embodiment of a face of an emotigraphic face or likeness displaying a happy face.
Figure 17B:
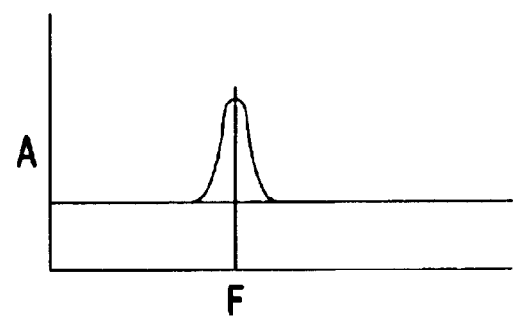
FIG. 17B shows an exemplary amplitude versus frequency graph plotting a talkers voice projected from a talker that might produce an emotigraphic face or likeness having an emotion similar to as shown in FIG. 17A.
Figure 18A:
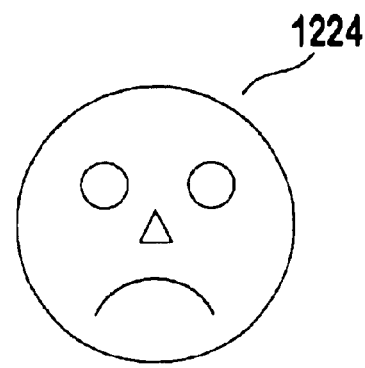
FIG. 18A shows another embodiment of an emotigraphic face or likeness displaying a silent person.
Figure 18B:
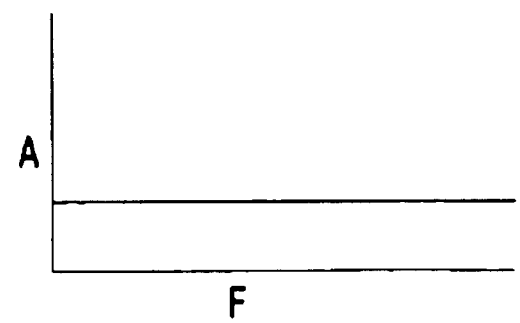
FIG. 18B shows an exemplary amplitude versus frequency graph plotting a voice of a silent talker that might produce an emotigraphic face or likeness as illustrated in FIG. 18A.

By comparison, if the talker is happy as shown by the emotigraphic face or likeness 1224 in FIG. 17A, the talker will likely be talking in a softer voice, and the voice signal will include a large number of smooth sinusoidal signals of generally lower amplitudes as shown in FIG. 17B. If the talker is not participating (as shown by the corresponding emotigraphic face or likeness 1224 in FIG. 18A), then there will be no voice signal to analyze as indicated in FIG. 18B. These emotions are illustrative and not limiting in scope. Similar voice analysis could be performed to see if the talker is sleepy, nervous, or in another emotional state.

A talker independent emotion detector 1504 is also provided that operates similarly to the talker dependent emotion detector 1506 except that a "typical" persons voice is stored in the prior neutral sample device 1508 instead of the actual talker's voice. This compares the talker's voice to a normal talker. For example, a typical angry person will "raise their voice", thus increasing the volume. As such, if a particular talker's voice is coming through as extremely loud, and contains a high frequency shift (which indicates that the voice is agitated) then the talker can be assumed to be angry. By comparison, as mentioned above, if the talker independent emotion detector 1504 indicates that the frequency analysis of the speaker's voice includes smooth sinusoidal signals in the frequency domain, then the speaker can generally be assumed to be happy.

The talker independent emotion detector 1504, operating by itself, may not always accurately indicate the mental state of each talker. For example, certain women's or men's voices are naturally soft-spoken. Therefore, even if such people are relatively angry, the detector may generate a smooth sinusoidal signal with fewer harmonics in the voice itself, simply because of the tonal qualities of the voice. In one embodiment, a judge emotion detector 1514 is included, which minimizes errors caused by inaccuracies of the talker independent emotion detector 1504 used alone by weighing the output from the talker independent emotion detector 1504 and the talker dependent emotion detector 1506. As such, the emotion indicated by both the talker independent emotion detector 1504 and the talker dependent emotion detector 1506 can be quantified. For example, the talker independent emotion detector 1504 may provide a quantifiable indication such that one particular talker has a 10% chance of being happy, 40% chance of being mad, and a 50% chance of being neutral. By comparison, the talker dependent emotion detector may indicate that the same speaker talker has different qualified emotions, e.g., a 30% chance of being mad, a 10% chance of being happy, and a 60% chance of being neutral. The emotions indicated by the emotigraphic can similarly be adjusted (e.g., an emotigraphic corresponding to a talker who is speaking with an 80% happy voice can be made to appear happier than an emotigraphic corresponding to a talker who is speaking with a 40% happy voice by providing a plurality of emotigraphics, or portions of emotigraphics, that display any emotion by a different amount).

These quantifiable outputs from both the talker independent emotion detector 1504 and the talker dependent emotion detector 1506 are then weighted as indicated by W1 and W2 and input to the judge emotion detector 1514, which determines the most likely emotion of the talker. Based upon the determination by the judge emotion detector, an output verdict of emotion signal is transmitted to the visual emotion indicator 1516. The visual emotion indicator 1516 includes the display that is viewed by the listener. The emotigraphics relating to each one of the talkers may be altered depending upon the emotional state indicator system. For example, suppose that one talker is speaking with an especially animated voice. The talker independent emotion detector 1504 in combination with the talker dependent emotion detector 1506 would both indicate the happy state of the talker. As such, the judge emotion detector 1514 would weigh the outputs of the emotion detectors 1504 and 1506, and output a verdict of emotion to the visual emotion indicator 1516 indicating that particular talker is happy.

Another talker may sound very angry. Both the talker dependent emotion detector 1506 (that would compare their angry voice to a prior neutral sample 1508) and the talker independent emotion detector 1504 (that would compare the angry voice to the voices of the public at large) would output these indications of angriness that would be weighed by the judge emotion detector. The judge emotion detector 1514 would then provide an indication of angry as the verdict of emotion to the visual emotion indicator 1516. The visual emotion indicator would therefore indicate an unhappy or skulking emotigraphic face. In addition, the body language provided to that emotigraphic may indicate walking around in circles, stamping feet, or other outwardly indications that the talker is unhappy, happy, or some other emotion at that time.

Assume the case in which a third talker has been silent for a considerable period of time. The judge emotion detector 1514 has stored the last time that that talker has spoken and the corresponding emotigraphic could indicate falling asleep, yawning, or some other activity associated with not speaking. Emotigraphics are relatively easy to generate graphically upon a display. Emotigraphic states for non-actively participating speakers could include humorous activities such as scratching, eating, snoring, blowing bubbles, chewing gum, swatting at flies, talking on a cellphone, etc.

The emotional state indicator system 1502 has been described relative to detecting the emotional state of a talker relative to their normal voice. It is envisioned however that it can also be used to indicate the veracity of a talker. It is known that some lie detection systems use the tonal characteristics of the voice to indicate the truthfulness of the speaker. Vocal-based lie detection systems are becoming more accessible, known, and relied on. Such vocal-based lie detection systems have been shown to be even more effective than their traditional lie-detecting counterparts. The embodiment of emotional state indicator system 1502 is especially suitable for lie detection systems because the use of the talker independent emotion detector 1504 and the talker dependent emotion detector 1506 (when the judge emotional detector 1514 is suitably weighted) limits errors resulting by either overemphasizing or underemphasizing the peculiar characteristics of an individuals voice.

This information describing the selected talker, i.e., whose voice most closely corresponds to the present voice, can be generated and either transmitted from the voice capture device to the voice projecting device separately from the actual voice or, alternatively, the talker identifier program can be located within the voice projecting device. As such, the display receives two types of information from the talker. The first information packet relates to when a talker is actually talking. The second information packet relates to which talker is the selected talker. The information relating to which talker is the actual talker can be used to determine which of the emotigraphics is to be made active. Presuming that one talker is talking at any given time, there would likely be only one active emotigraphic at a time. Once a particular emotigraphic is made active, when the talker indicator determines that the talker is actually talking, in one embodiment the lips of the emotigraphic will move in a corresponding manner to the voice of the selected talker. As such, as the selected talker talks and the voice is projected from a selected location to the listeners, the active emotigraphic relating to that selected talker will also have its lips moving.

Each emotigraphic may contain a fair amount of information relating to each particular talker. Such as an individual's name, company, and title. Making the emotigraphics active, thereby moving their lips in cadence with the voice that is projected, will allow the listener to visually track which talker is talking. The visual queues from the emotigraphics will accompany the voice cues. This will make it much easier for listeners in a teleconference device to remember who is speaking.

There are various techniques for generating the emotigraphic. In one embodiment, a pre-stored emotigraphic 1524 can be accessed by the controller 39. The use of pre-stored emotigraphics is most suitable when the details of the emotigraphics are relatively simple. Another embodiment involves the use of initially or pre-stored, caricatures and/or images of talkers 1520 in conjunction with the emotion image morphing engine 1522. Pre-stored caricatures and/or images of talkers may be stored in, for example, a corporate or personal database along with those of all talkers that are likely to be using the talker indicator. Based upon the emotion detected within the controller, the emotion image morphing engine 1522 operates to morph the imagines and/or caricatures of the talkers and provide an emotigraphic image indicating whether the talker is happy, sad, silent, etc. An increased level of emotion may be provided by the emotion image morphing engine 1522 the talker stamping their feet, sleeping, or performing some other such activity whether emotigraphics are icon based, photographic image based or a combination thereof.

Embodiment for the display 54 shown in FIG. 15 is similar to that described above, for example in FIG. 8.

However, in the FIG. 15 embodiment, the display must be at least of adequate quality to indicate the emotions of each of the respective talkers.

The amount of details provided to the different emotigraphics can vary depending upon such things as the audience, the display characteristics, and the talker identification correlation processing capabilities. If there is an image of the selected talkers, then that image can be projected upon the emotigraphic to make it appear as if the actual individual is speaking. The more details in the emotigraphic, the more the listeners will be able to determine which one of the different talkers is speaking.

It also is not necessary that all the selected talkers be at the same location. If you have a various talkers at different locations, and the listeners are at the same location, then the emotigraphics corresponding to the talkers can still be displayed as on the same stage or in the same room. In the situation where the talkers are in different locations, a talker identification correlation device becomes less significant in differentiating between which of the talkers is actually speaking. In this case, the various input signals received from the different talkers can be monitored to determine which ones are talking. For example, a voice signal strength sensor may be connected to each of the different lines from the different talkers. When any particular line reaches a prescribed strength level, then the emotigraphic corresponding to that particular selected talker can be made active. As such, the mouth of that emotigraphic will be opened and closed in cadence with the speech of the selected talker. Similarly, the emotigraphic corresponding to that selected talker can be made to appear angry, sad, happy, or some emotion corresponding to the voice characteristics of the selected talker.

While the principles of the invention have been described above in connection with the specific apparatus and associated method, it is to be clearly understood that this description is made only by way of example and not as a limitation on the scope of the invention.

What is claimed is:

1. A method for communicating a voice signal and talker identification information from a plurality of talkers to at least one listener, the method comprising:
    conveying the voice signal from the plurality of talkers to a first terminal point;
    conveying the talker identification information that individually identifies each one of the plurality of talkers to a second terminal point, wherein the listener can access the voice signal from the first terminal point and the talker identification information from the second terminal point; and
    indicating to the listener which talker is speaking in response to the talker identification information;
    wherein the indicating the talker includes projecting voices corresponding to different talkers at different signal strengths through a plurality of speakers to different apparent locations relative to the first terminal point.

2. The method of claim 1, further comprising:
    providing a plurality of channels, each channel extending at least part of the way between at least one of the plurality of talkers and the listener;
    associating each one of the plurality of channels with one or more of plurality of talkers; and
    transmitting signals through at least some of the plurality of channels, each signal corresponds to a distinct talker who is speaking.

3. The method of claim 2, further comprising using a channel identifier to derive a pointer into a database to identify data relevant to the talker who is speaking at any given time.

4. The method of claim 1, wherein said second terminal point includes a visual display including at least one from the group of a plurality of LEDs, an alphanumeric display, a graphical display, a CRT display, an LCD display, a holographic projection, or an audible sound segment to display the talker identification information.

5. The method of claim 1, wherein said second terminal point includes a visual display including a plurality of areas, each area in said plurality of areas represents one or more of said talkers, and the method includes differentiating the area representing said talker who is speaking relative to areas representing other talkers.

6. The method of claim 1, wherein the indicating the talker who is speaking is provided over a display, the indicating includes one from the group of illuminating a portion of the display, changing the color of a portion of the display, blinking a portion of the display, varying the intensity of a portion of the display, and varying multiple characteristics of a portion of the display.

7. The method of claim 1, wherein the indicating the talker includes displaying a figure, the figure is displayed using at least one from the group of iconic graphics, caricature graphics, emotigraphics, alphanumerics, graphics, digital photographics, animated graphics, hybrid digital photographic and caricatures, text blocks, and combined text and graphics.

8. The method of claim 7, wherein the indicating the talker further includes at least one from the group of animating, highlighting, enhancing, embellishing with text, blinking, morphing, flipping, changing the color of, changing the intensity of, animating the subcomponents of; changing the apparent emotional state of, animating the mouth of, or rotating the figure representing the talker.

9. The method of claim 1, wherein the conveying the talker characteristic information includes a text block containing information about the talker.

10. The method of claim 9, including providing text in the text box relating to the voice signal of the talker within maid text box.

11. The method of claim 1, wherein the projecting uses a head related transfer function (HRTF) technique.

12. The method of claim 1, wherein the projecting includes associating an audio announcement with a segment of the voice signal.

13. The method of claim 12, wherein said audio announcement includes an indicator that distinguishes the talker who is speaking from other talkers.

14. The method of claim 13, wherein the audio announcement includes one from the group of the talker's name, a musical sequence, a tone, a beep, an alert, a warble, a click, a buzz, or a subsonic pulse.

15. The method of claim 13, wherein said audio announcement preceds the talkers voice signal.

16. The method of claim 12, including;
    temporally compressing the voice signal from an original length to a shortened providing the audio announcement with a duration substantially equal to the difference between said original length and said shortened length;
    mixing said temporally compressed voice signal and said audio announcement to create a mixed temporally compressed sound segment that lasts less than or equal to the same duration as the original length of the voice signal; and playing the mixed temporally compressed voice signal and the audio announcement at the first terminal point.

17. The method of claim 16, wherein the pitch of the temporally compressed voice signal is substantially equal to the pitch of the original voice signal.

18. The method of claim 1, further including:
creating a unique handle for each talker in a conference call over the talker identification system;
storing a voice sample for one or more talkers;
retrieving the voice sample for one or more talkers; and
matching the voice sample from each of the one or more talkers that most closely match the voice signal.

19. The method of claim 18, further including:
capturing and storing data relevant to each talker; and
retrieving data relevant to each talker from storage.

20. The method of claim 19, wherein the voice signal is conveyed over the Internet.

21. The method of claim 1, wherein said voice signal is carried on a packet based network as a series of packets, and said packets include packet origination information, the method additionally including:
extracting at least a part of said packet origination information from said series packets to provide origination data;
searching, using a part of said origination information as a keyword, to determine at least one component of said talker identification information; and
storing, using a part of said origination data as a lookup handle in a storage element, containing part of said talker identification information.

22. The method of claim 1, wherein the voice signal and the talker identification information are carried over separate networks.

23. The method of claim 1, wherein the voice signal and the talker identification information are carried over the same network, but said talker identification information is conveyed over a side-band of the network and the voice signal is conveyed over a main band of the network.

24. The method according to claim 1, wherein the talker identification information is used to graphically indicate the identity of the talker.

25. The method according to claim 1, further comprising distinguishing the identity of the talker who is speaking by correlating the voice signal with prior stored records of the voices of all the talkers.

26. The method according to claim 1, wherein each one of the plurality of talkers are located proximate a voice capture device.

27. The method of claim 26, wherein the voice capture device includes a plurality of voice capture devices.

28. The method of claim 1, wherein the voice signal and the talker identification information are carried over the same network, but said talker identification information is conveyed over a main-band of the network and the voice signal is conveyed over a side band of the network.

29. The method of claim 1, wherein the talker identification information includes spatial information about the talker that is speaking.

30. A method for indicating the voice of each talker from a plurality of talkers, using a signal being transmitted over a telecommunications system to be heard by a listener, the method comprising:
projecting the voice from each one of the plurality of talkers to the listener;
providing a talker indicator proximate to the listener;
generating talker identification information in the talker indicator that can be used to indicate the identity of each talker to the listener; and
providing a device coupled to the talker indicator that can transmit the voice signal to the listener;
wherein the projecting includes projecting voices corresponding to different talkers at different signal strengths through a plurality of speakers to different apparent locations relative to the listener.

31. The method according to claim 30, wherein the talker indicator includes audio.

32. The method according to claim 30, wherein the talker indicator includes video.

33. The method according to claim 30, wherein the talker indicator includes a display.

34. The method according to claim 33, wherein the display provides a visual figure representing each one of the plurality of talkers.

35. The method according to claim 30, further comprises providing an active window indicator proximate each of the identity indicators.

36. The method according to claim 35, wherein the active window indicator is configured to indicate the talker that is talking at any given time.

37. An apparatus for regenerating voices spoken by a plurality of talkers, wherein the voices were originally captured and correlated to yield talker information including a selected talker from said plurality of talkers, the apparatus comprising:
a voice retransmission device for producing the regenerated voice; and
a talker indicator for indicating the identity of the talker associated with one of the regenerated voices.

38. The apparatus of claim 37, wherein the talker indicator includes a visual display.

39. The apparatus of claim 37, wherein the visual display includes a two dimensional graphical display.

40. The apparatus of claim 37, wherein the display visually displays one emotigraphic that corresponds to each one of said plurality of talkers.

41. The apparatus of claim 40, wherein the talker identification includes a correlation device can correlate the emotion of said selected talker by correlating the voice of the selected talker with a plurality of voice recordings of the selected talker, multiple ones of said voice recordings were previously mapped to the selected talker when the talker was in different moods.

42. The apparatus of claim 40, wherein the emotigraphic comprises one from the group of an emotion that displays an emotion in response to said correlated emotion of the selected talker, or a list of names, the names correspond to the selected talker.

43. The apparatus of claim 40, wherein the talker indicator further includes a voice modification portion that generates an altered voice for each one of said plurality of talkers, wherein the voice modification portion enhances identification of the produced voice from said plurality of talkers.

44. The apparatus of claim 43, wherein the voice modification portion further comprises a sound field spatialization device that produces the voice from each one of said plurality of talkers appears to emanate from distinct locations.

45. The apparatus of claim 43, wherein the voice modification portion further comprises a variable voice amplification device that amplifies selected altered voices from the plurality of talkers differently.

46. The apparatus of claim 43, wherein the voice modification portion further comprises a nasaling algorithm device that applies a modified nasaling algorithm to each voice altered voice.

47. The apparatus of claim 37, further comprising a sound coordinate receiving device that generates output voices corresponding to the selected talker in response to spatial coordinate information.

48. The apparatus of claim 47, further comprising a medium for transmitting the transmission sound information from the sound coordinate transmission device to the sound coordinate receiving device.

49. An apparatus for conveying a voice signal and the identity of a talker comprising:
   a sound coordinate capture device for generating spatial voice information in response to a plurality of voices spoken by a respective plurality of talkers;
   a talker identifier correlation device, coupled to the sound coordinate capture device, for selecting the talker from the plurality of talkers that most likely produced the voice based on the spatial voice information;
   a voice retransmission device for producing regenerated voices in response to the spatial voice information; and
   a talker indicator for spatially indicating the identity of the talker that produced the voice.

50. A method for displaying an emotigraphic over a display, the emotigraphic may be provided with a plurality of emotional expressions, the method comprising:
   receiving voice input including talker identification information, wherein the talker identification information includes attitude indication information;
   selecting one of the emotional expressions in response to the attitude indication information and in response to the talker identification information; and
   displaying the emotigraphic with the selected emotion expression.

51. The method of claim 50, wherein the emotigraphic includes a body, and the emotion expression is at least partially indicated by a motion of the body.

52. The method of claim 50, wherein the emotigraphic includes a face, and the emotion expression is at least partially indicated by a facial expression of the face.

53. The method of claim 50, further comprising:
   establishing talker identification information that indicates the talker associated with each one of the plurality of voices;
   providing the talker identification information to the voice projecting device; and
   providing each one of the plurality of voices at a distinct spatial location at an voice projecting device corresponding to the identity of the talker associated with each voice in response to the talker identification information.

54. An apparatus for conveying a voice signal, the identity of at least one talker, and the special location of the talker across a communication network comprising:
   a spatialization determiner that spatially determines the location of a voice originating from a distinct spatial location, the spatialization determiner comprising:
      a steerable beamformer that can be steered to receive voices from different spatial positions, comprising:
         a primary microphone; and
         a plurality of secondary microphones acting in conjunction with the primary microphone to determine angular location of each talker relative to a reference point;
      an adaptive filter coupled to the steerable beamformer, to optimize steering of the steerable beamformer to optimize the received voice from the beamformer;
      a location coordinate detector coupled to the beamformer secondary microphone signals,
      a beamformer controller coupled to the beamformer and the location coordinate dectector for identifying physical locations of each talkers; and
      a talker identifier coupled to the beamformer primary microphone signal for prompting the talker for identification and for transmitting the identification information to the network;
      whereby the talker identification and location are determined detector.

55. A method for communicating a voice signal and talker identification information from a plurality of talkers to at least one listener, the method comprising:
   conveying the voice signal from the plurality of talkers to a first terminal point;
   conveying the talker identification information that individually identifies each one of the plurality of talkers to a second terminal point, wherein the listener can access the voice signal from the first terminal point and the talker identification information from the second terminal point; and
   indicating to the listener which talker is speaking in response to the talker identification information;
   wherein the indicating the talker includes projecting the voice corresponding to different talkers to different apparent locations relative to the first terminal point; and
   wherein the projecting includes associating an audio announcement with a segment of the voice signal;
   said method further comprising:
   temporally compressing the voice signal from an original length to a shortened length;
   providing the audio announcement with a duration substantially equal to the difference between said original length and said shortened length;
   mixing said temporally compressed voice signal and said audio announcement to create a mixed temporally compressed sound segment that lasts less than or equal to the same duration as the original length of the voice signal; and
   playing the mixed temporally compressed voice signal and the audio announcement at the first terminal point.

56. The method of claim 55, wherein the pitch of the temporally compressed voice signal is substantially equal to the pitch of the original voice signal.

57. A method for communicating a voice signal and talker identification information from a plurality of talkers to at least one listener, the method comprising:
   conveying the voice signal from the plurality of talkers to a first terminal point;
   conveying the talker identification information that individually identifies each one of the plurality of talkers to a second terminal point, wherein the listener can access the voice signal from the first terminal point and the talker identification information from the second terminal point; and
   indicating to the listener which talker is speaking in response to the talker identification information;
   wherein said voice signal is carried on a packet based network as a series of packets, and said packets include packet origination information, the method additionally including:
   extracting at least a part of said packet origination information from said series packets to provide origination data;

searching using a part of said origination information as a keyword, to determine at least one component of said talker identification information; and storing using a part of said origination data as a lookup handle in a storage element, containing part of said talker identification information.

58. A method for communicating a voice signal and talker identification information from a plurality of talkers to at least one listener, the method comprising:

conveying the voice signal from the plurality of talkers to a first terminal point;

conveying the talker identification information that individually identifies each one of the plurality of talkers to a second terminal point, wherein the listener can access the voice signal from the first terminal point and the talker identification information from the second terminal point; and indicating to the listener which talker is speaking in response to the talker identification information;

wherein the voice signal and the talker identification information are carried over separate networks.

59. A method for communicating a voice signal and talker identification information from a plurality of talkers to at least one listener, the method comprising:

conveying the voice signal from the plurality of talkers to a first terminal point;

conveying the talker identification information that individually identifies each one of the plurality of talkers to a second terminal point, wherein the listener can access the voice signal from the first terminal point and the talker identification information from the second terminal point; and indicating to the listener which talker is speaking in response to the talker identification information;

wherein the voice signal and the talker identification information are carried over the same network, but said talker identification information is conveyed over a side-band of the network and the voice signal is conveyed over a main band of the network.

60. A method for communicating a voice signal and talker identification information from a plurality of talkers to at least one listener, the method comprising:

conveying the voice signal from the plurality of talkers to a first terminal point;

conveying the talker identification information that individually identifies each one of the plurality of talkers to a second terminal point, wherein the listener can access the voice signal from the first terminal point and the talker identification information from the second terminal point; and indicating to the listener which talker is speaking in response to the talker identification information;

wherein the voice signal and the talker identification information are carried over the same network, but said talker identification information is conveyed over a mainband of the network and the voice signal is conveyed over a side band of the network.

* * * * *

UNITED STATES PATENT AND TRADEMARK OFFICE
CERTIFICATE OF CORRECTION

PATENT NO. : 6,882,971 B2
DATED : April 19, 2005
INVENTOR(S) : Craner

It is certified that error appears in the above-identified patent and that said Letters Patent is hereby corrected as shown below:

<u>Column 29,</u>
Line 64, after the words "more of", insert -- the --.

<u>Column 30,</u>
Line 41, after the word "within", delete "maid" and insert therefor -- said --.
Line 56, after the word "announcement", delete "preceds" and insert therefor -- precedes --.
Line 57, after the word "including", delete ";" and insert therefor -- : --.

<u>Column 32,</u>
Line 32, after the word "with", insert -- each --.

<u>Column 34,</u>
Line 5, after the word "each", delete "talkers" and insert therefor -- talker --.

Signed and Sealed this

Eighth Day of November, 2005

JON W. DUDAS
*Director of the United States Patent and Trademark Office*